(12) United States Patent
Dinh

(10) Patent No.: US 7,064,268 B2
(45) Date of Patent: Jun. 20, 2006

(54) FLOOR BOX COVER ASSEMBLY

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/222,464

(22) Filed: Sep. 8, 2005

(65) Prior Publication Data

US 2006/0060368 A1   Mar. 23, 2006

Related U.S. Application Data

(60) Provisional application No. 60/611,978, filed on Sep. 22, 2004.

(51) Int. Cl.
*H02G 3/04*   (2006.01)

(52) U.S. Cl. .................. 174/48; 174/64; 174/65 R; 439/138; 220/4.02

(58) Field of Classification Search .............. 174/48, 174/64, 65 R; 439/138, 142, 536; 220/4.02; 248/906

See application file for complete search history.

(56) References Cited

U.S. PATENT DOCUMENTS

| 3,873,758 | A | | 3/1975 | VanGessel et al. |
| 3,956,573 | A | | 5/1976 | Myers et al. |
| 4,044,908 | A | | 8/1977 | Dauberger |
| 4,054,222 | A | | 10/1977 | Suk |
| 4,783,577 | A | | 11/1988 | Mohr |
| 4,916,258 | A | * | 4/1990 | Mohr .................. 174/48 |
| 5,007,549 | A | | 4/1991 | Suk |
| 5,705,772 | A | | 1/1998 | Brown |
| 6,450,353 | B1 | | 9/2002 | Riedy et al. |
| 6,545,215 | B1 | | 4/2003 | Young et al. |
| 6,552,262 | B1 | | 4/2003 | English et al. |
| 6,840,785 | B1 | * | 1/2005 | Drane .................. 439/138 |
| 6,843,669 | B1 | * | 1/2005 | Drane et al. .......... 439/142 |

* cited by examiner

*Primary Examiner*—Dhiru R. Patel
(74) *Attorney, Agent, or Firm*—Hoffmann & Baron, LLP

(57) ABSTRACT

A floor box cover assembly includes a cover and a ring assembly. The cover is pivotally connected to the ring assembly. The ring assembly rotates to allow the wires to extend through an access opening in the cover into the interior of a housing during use or to block the access opening in the cover to prevent access to interior of housing during nonuse.

23 Claims, 25 Drawing Sheets

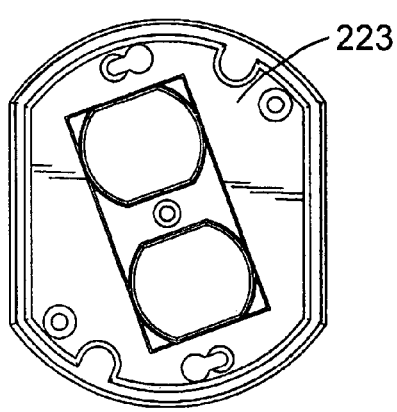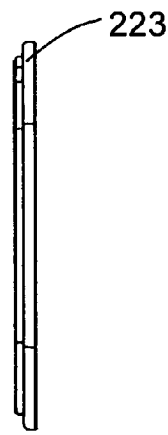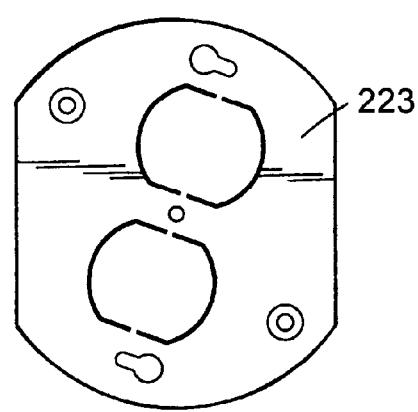
FIG. 16　　FIG. 16A　　FIG. 16B
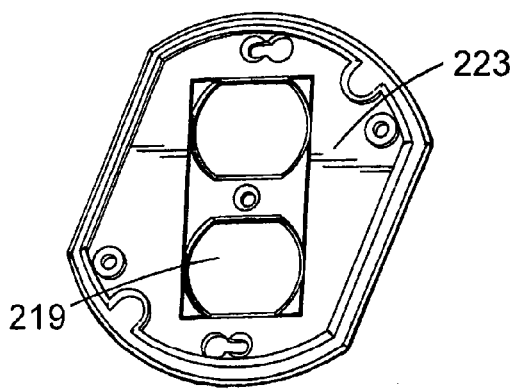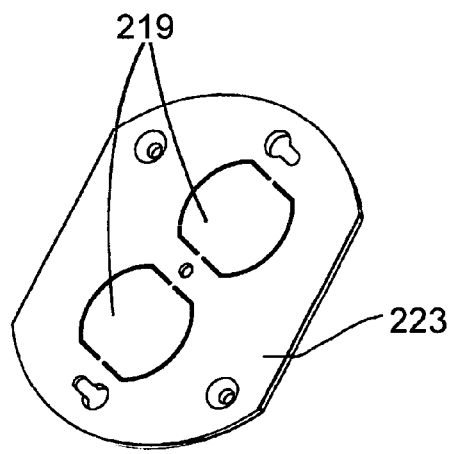
FIG. 16C　　FIG. 16D

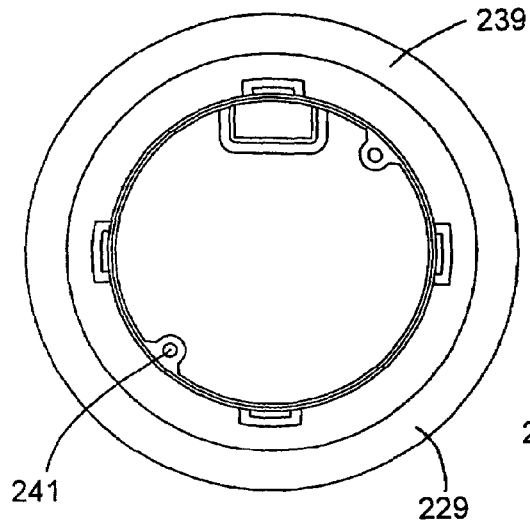
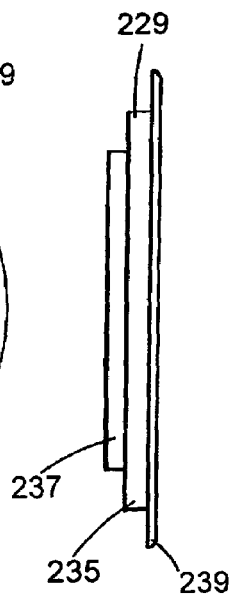
FIG. 19A
FIG. 19
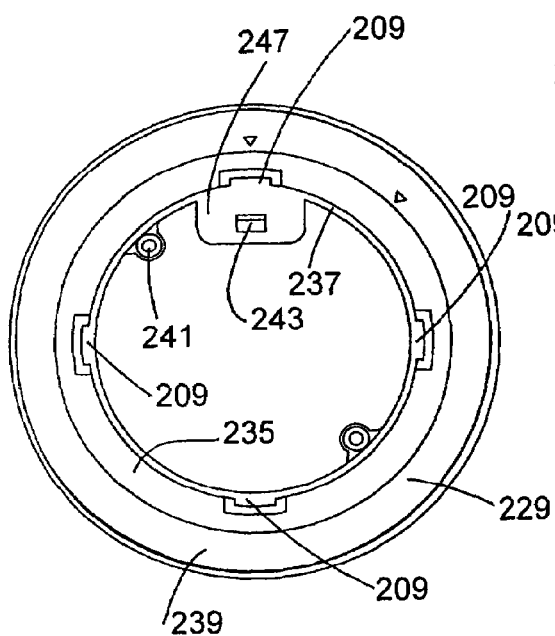
FIG. 19B
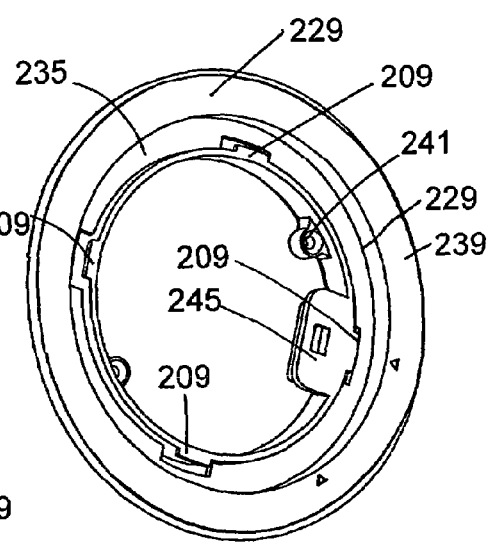
FIG. 19C

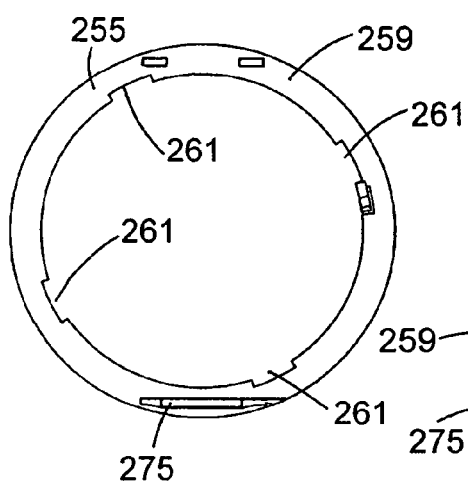
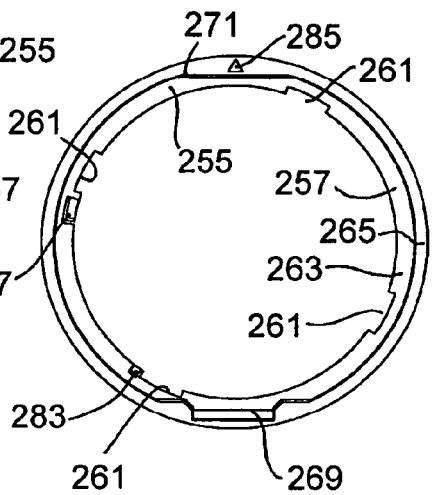
FIG. 20    FIG. 20A    FIG. 20B
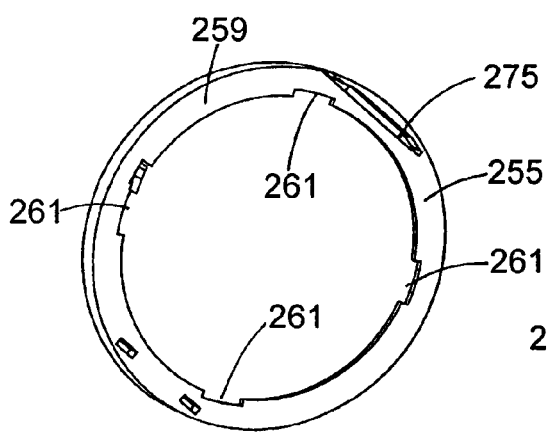
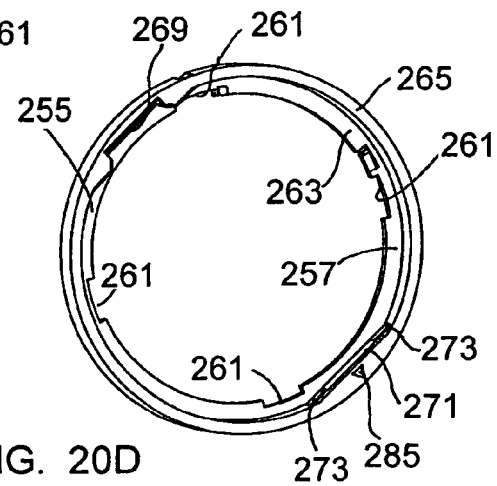
FIG. 20C    FIG. 20D

FLOOR BOX COVER ASSEMBLY

CROSS-REFERENCE TO RELATED APPLICATIONS

This application claims priority to U.S. Provisional Application No. 60/611,978, filed Sep. 22, 2004.

FIELD OF THE INVENTION

The present invention relates generally to a floor box which houses power and communication wires for termination. More specifically, the present invention relates to a cover assembly for a floor box which rotates from a self-contained state to an open position to create an opening for wires there through.

BACKGROUND OF THE INVENTION

It is well known to run electrical wires and telecommunications wires underneath the surface of a floor. These cables and electrical systems may be placed under the floor surface so as to provide more efficient supply power and data/telecommunication signal in commercial construction buildings. The electrical cables or wires beneath the floor may be accessed through a hole in the surface of the floor. In order to provide convenient access to the wires as well as the termination devices which terminate the wires, a floor box is typically placed in the hole through the floor.

The cables are typically housed in ducts that are placed beneath the floor surface. These ducts are typically made of a metal, i.e. steel, iron, aluminum, etc., for structural rigidity to support the weight of the floor on top of the ducts. After the ducts are properly positioned in the floor, concrete then covers the ducts to create the actual floor surface. The thickness of the concrete floor, and the depth at which the ducts must be buried in the floor, are usually regulated by local building codes. The floor boxes may be integrated into the ducts before the concrete floor is poured. However, in most instances, the concrete floor is poured over the ducts and then holes are drilled into the floor to insert the floor boxes that are connected to the duct.

The use of floor boxes to access cables running underneath the surface of a floor is well known in the art. The floor boxes are typically made of a metallic material so that they are resistant to the outside elements, such as moisture, and are also strong enough to maintain the structural integrity of the floor. The floor boxes are typically welded together to further increase their strength.

With many electrical boxes, especially those which are used to house termination devices positioned within a floor, it is desirable to construct the box to be water resistant, so as to protect the components housed therein. Undesirable accumulation of water within the box can be detrimental to such components. Various electrical codes and standards such as those promulgated by Underwriters Laboratories (UL) require the floor boxes to have a certain degree of water resistance, i.e., resistance to entry of water over a period of time.

The art has seen a wide variety of box constructions which are designed to prevent the accumulation of water within the box. Many of these designs employ complicated gaskets which are interposed between the box and the cover of the box so as to prevent water from entering therebetween. While these gaskets do adequately prevent water entry, the gasket structures rely on precise assembly of the components, including the gaskets.

Alternatively, some floor box covers have a small door thereon. The door allows the cover to be in a closed position, while the wires can exit through the door. However, the door protrudes above the cover which can break off creating a tripping hazard.

Further, it is desirable to provide a cover assembly having a substantially flat surface with no protruding parts that may break off or cause a tripping hazard.

SUMMARY OF THE INVENTION

A floor box cover assembly is provided for allowing wires and cables to be connected therein. The floor box cover assembly includes a cover and a ring assembly. The cover is interconnected to the ring assembly. The ring assembly and the cover including a corporative rotational access member for allowing access of wires through, or preventing access through the floor box cover assembly into a floor box housing upon rotation of the ring assembly and the cover.

Further, a floor box cover assembly includes a first ring, a second ring and a cover. The first ring includes a raised inner annular lip and planar flange thereabout. The flange includes an elongated hole therethrough. The second ring includes a top surface and a bottom surface. The top surface has a planar inner rim and a depending raised wedge thereabout. The raised wedge includes a pivotal engagement portion and the second ring seats on top of the planar flange of the first ring. The cover includes a pivotal cover portion. The pivotal engagement portion of the second ring and the pivotal cover portion cooperatively provide a pivotal connection of the cover to the second ring to provide for access to the inner housing.

BRIEF DESCRIPTION OF THE DRAWINGS

FIG. 16 is the top view of the bottom wall of the terminal housing of FIG. 15.

FIG. 16A is the side profile of the bottom wall of FIG. 16.

FIG. 16B is the bottom view of the bottom wall of FIG. 16.

FIG. 16C is the top perspective view of FIG. 16.

FIG. 16D is the bottom perspective view of FIG. 16.

FIG. 19 is a bottom view of the first ring assembly of FIG. 15.

FIG. 19A is a side profile view of the first ring assembly of FIG. 19.

FIG. 19B is the top view of the first ring assembly of FIG. 19.

FIG. 19C is a top perspective view of the first ring assembly of FIG. 19.

FIGS. 20 and 20C are bottom views of the second ring assembly of FIG. 15.

FIG. 20A is a side profile view of the second ring assembly of FIG. 15.

FIGS. 20B and 20D are top views of the second ring assembly of FIG. 15.

DETAILED DESCRIPTION OF THE PREFERRED EMBODIMENTS

The present invention contemplates a floor box cover assembly which is substantially water resistant. The floor box cover assembly rotates to create an opening for cables or wires to exit therethrough. Further, when the floor box is not in use the floor box cover assembly rotates to close or block the opening in the cover to prevent water from entering the box therethrough. The floor box cover assembly of the present invention is used in combination with a termination housing and a floor box housing, or other support member depending on the desired use of the cover assembly.

Figure 1:
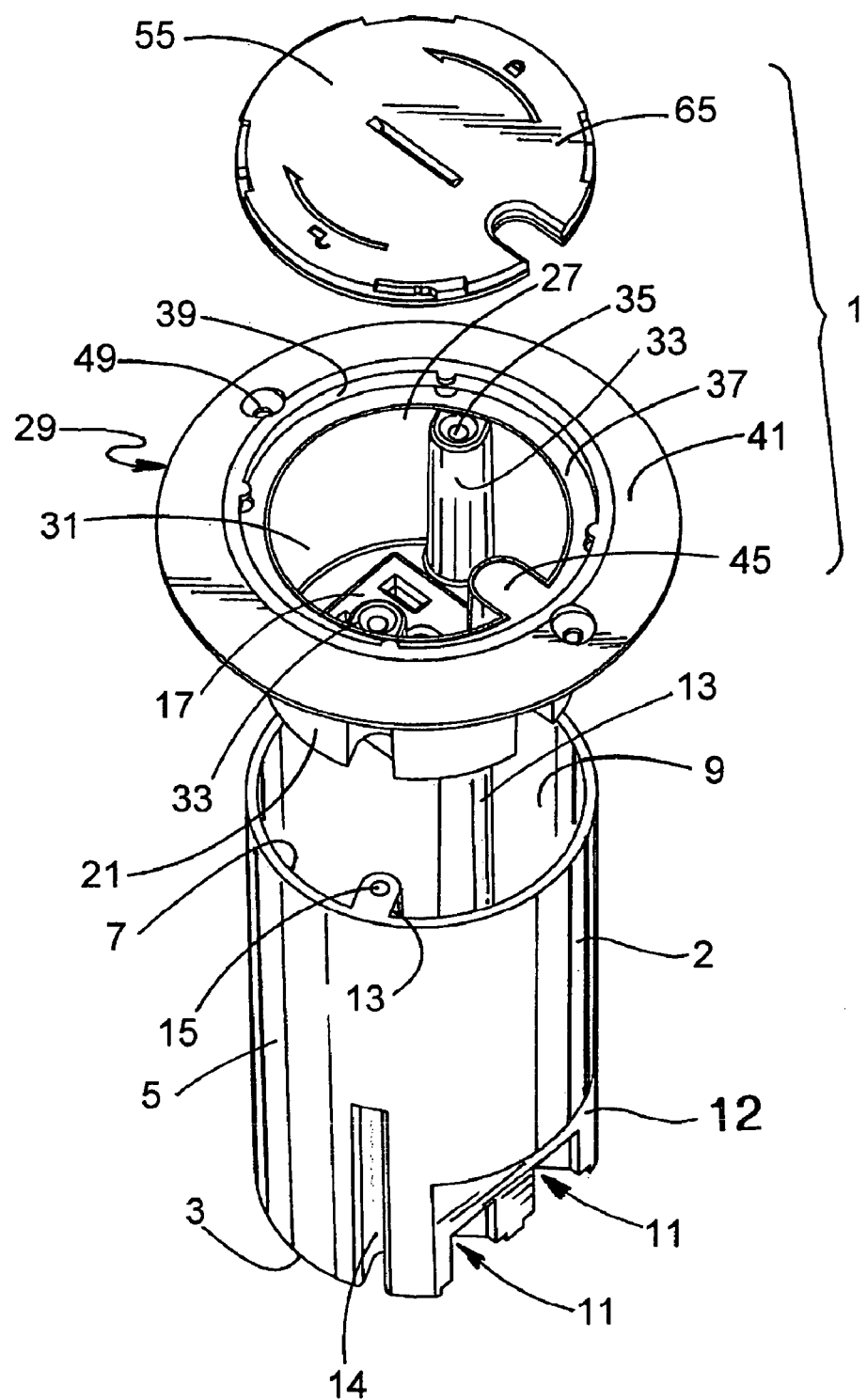
FIG. 1 is a perspective top view of a first embodiment of the floor box and cover assembly of the present invention.

Referring to FIG. 1, a perspective view of a first embodiment of the floor box cover assembly 1 of the first embodiment is shown. The floor box cover assembly 1 is used in combination with a floor box housing to provide termination of power, data, and communication wires therethrough.

Figure 2:
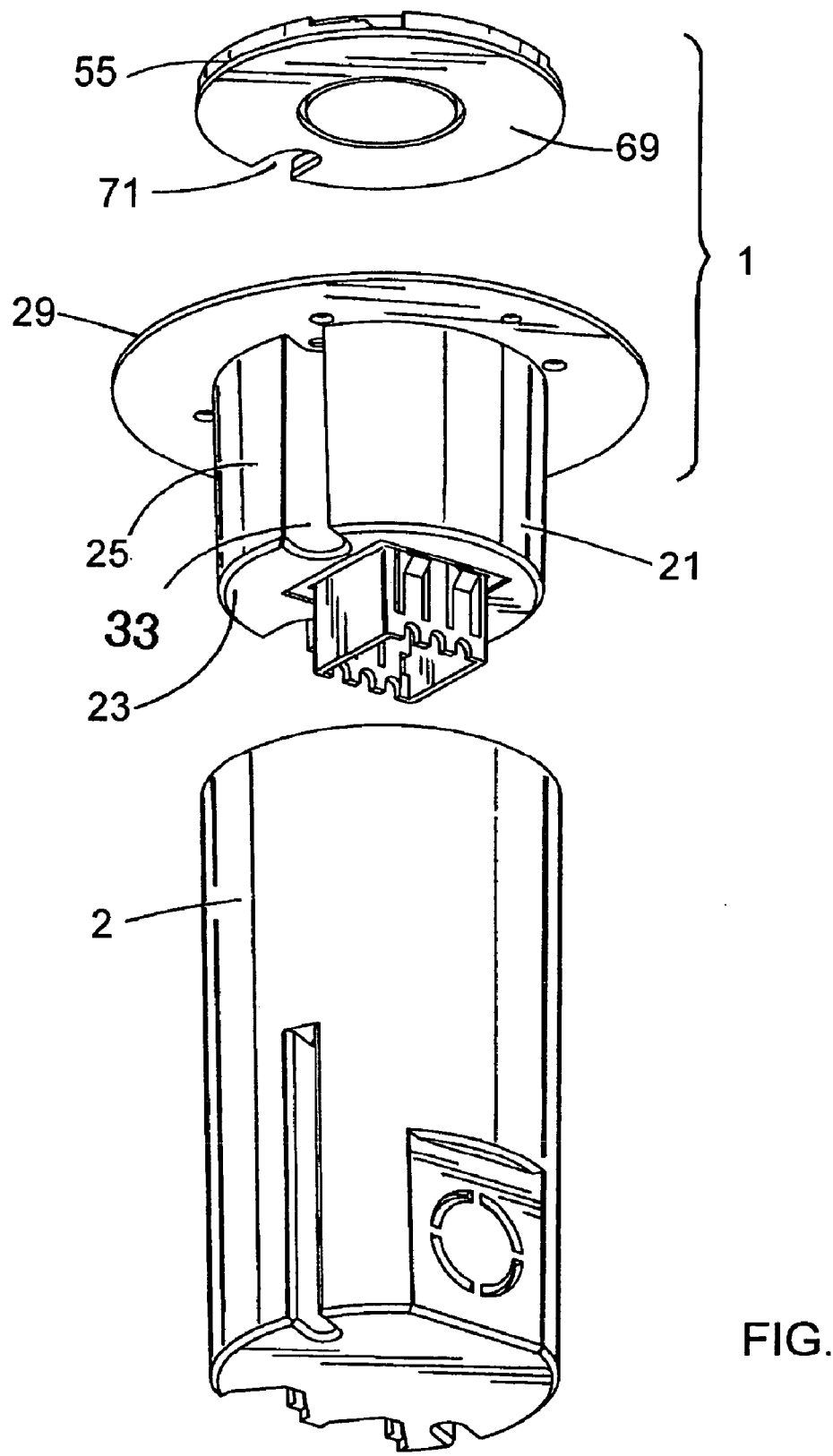
FIG. 2 is a perspective bottom view of FIG. 1.

FIG. 1 shows floor box housing 2 including a bottom wall 3 and upstanding cylindrical wall 5 terminating in a circular open end 7. Floor box housing 2 defines a housing interior 9 which permits the termination of both power and data/communication wires therein. Access to the interior 9 of floor box housing 2 for such wires is provided by ports 11 which extend through cylindrical wall 5 and/or the adjacent bottom wall 3. As shown in FIGS. 1 and 2, the ports 11 are generally provided through an indented planar surface 12 of the cylindrical side wall 5 and a portion of the adjacent bottom wall 3. A plurality of ports 11 are shown which are positioned about cylindrical side wall 5 and/or bottom wall 3. Each port allows the wires to feed into floor box housing 2 for termination of conduit therein.

Floor box housing 2 further includes a fastening mechanism to attach the termination housing and floor box cover assembly together, either indirectly or directly. FIG. 1 shows floor box housing 2 including an attachment mechanism, such as a pair of screw channels 13 which project into the interior 9 of the floor box housing 2 and extend the length of internal surface of the cylindrical wall 5, from the circular open end 7 to the bottom wall 3. The screw channels 13 are partially enclosed having a screw hole 15 at the circular open end 7. The screw channels 13 are positioned on diametrically opposite sides of the floor box housing 2. The screw channels 13 in conjunction with an attachment mechanism in the termination housing and/or cover assembly are used to attach the housings and assembly together.

Floor box housing 2 may be formed of a suitable plastic material such as polyvinylchloride (PVC) and may be formed in a wide variety of known plastic forming techniques. Further, floor box housing 2 may be formed of various metallic material as known in the art.

While a floor box housing 2 is shown herein various floor box housing, as known in the art, may be adaptable to the floor box cover assemblies described herein.

FIGS. 1–7 show a floor box cover assembly 1 and termination housing 21 of the present invention. The floor box cover assembly 1 includes a ring assembly 29 and a cover 55. FIG. 1 shows the termination housing 21 as a molded part of the floor box cover assembly 1. However, it is contemplated that the floor box cover assembly may be a separate unit attachable to various termination housings, as known in the art, adapted to receive the cover assembly.

The termination housing 21 includes a bottom wall 23, upstanding cylindrical wall 25 and an open end 27, which defines the termination housing interior 31. The termination housing interior 31 permits the termination of power, data, communication plugs and jacks therein, for example, FIG. 1 shows an electrical power receptacle 17.

Figure 3:
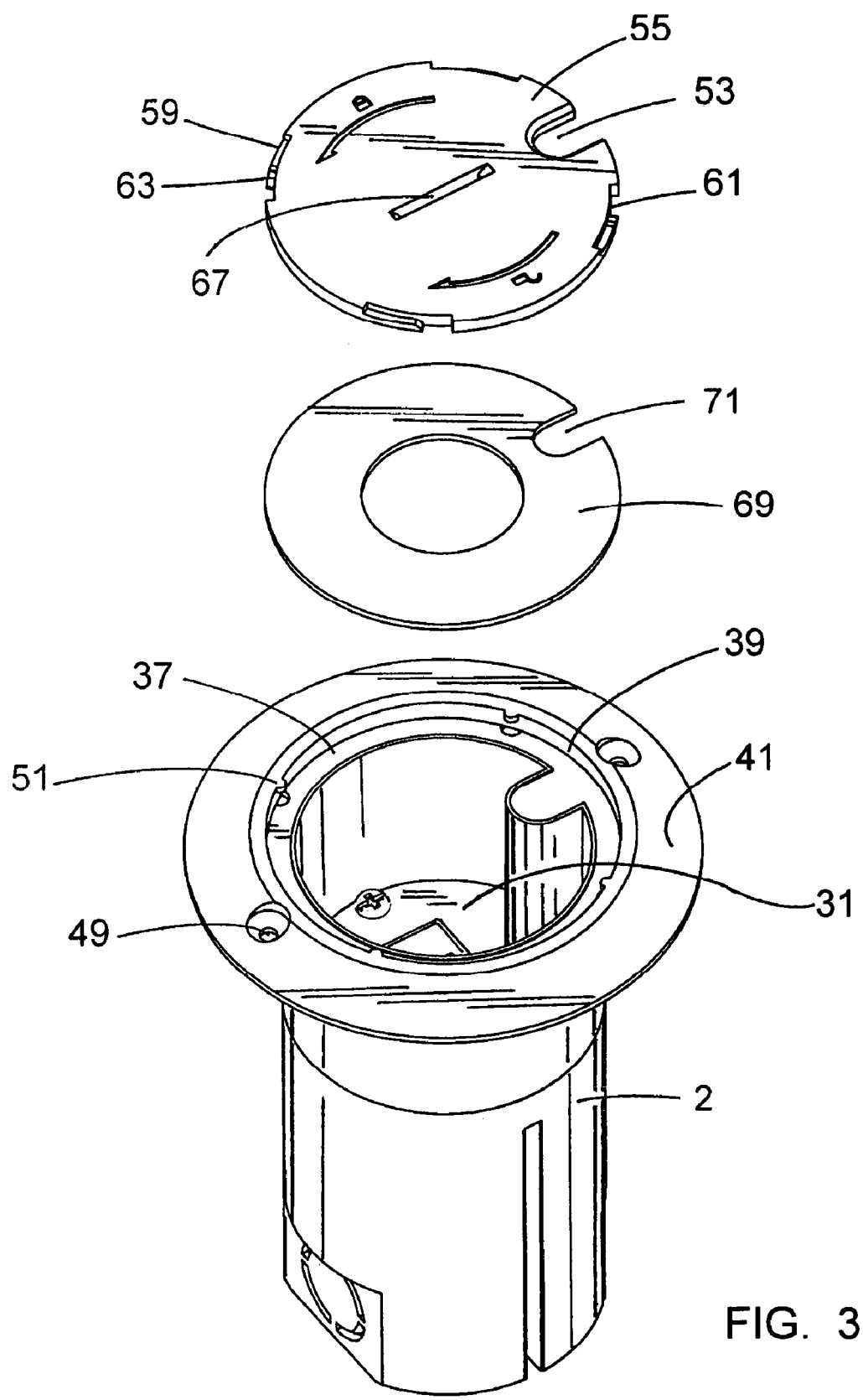
FIG. 3 is a perspective top view of FIG. 1.
Figure 4:
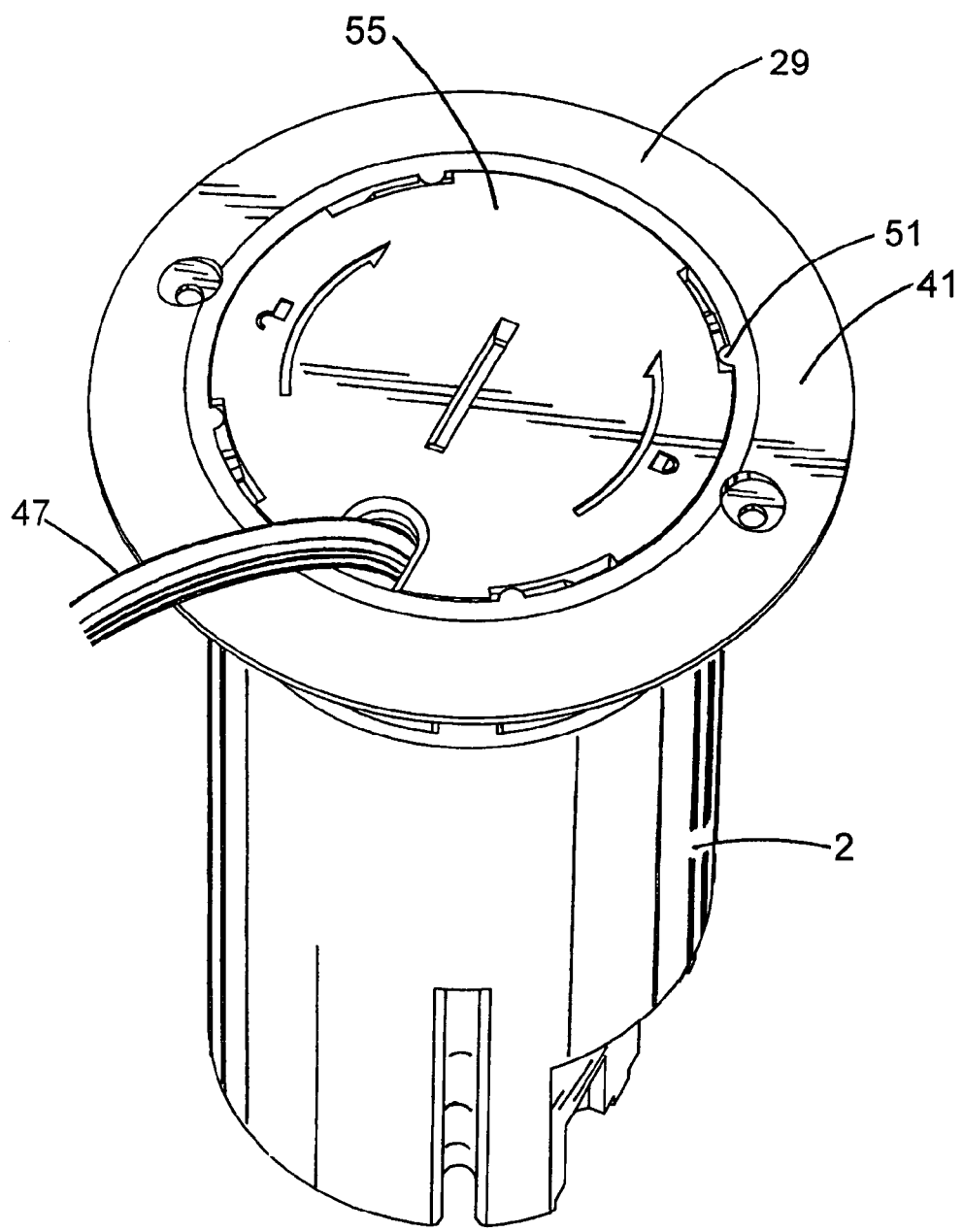
FIG. 4 is a perspective view of FIG. 1 assembled and in the locked-open position, having wires exiting therethrough.
Figure 5:
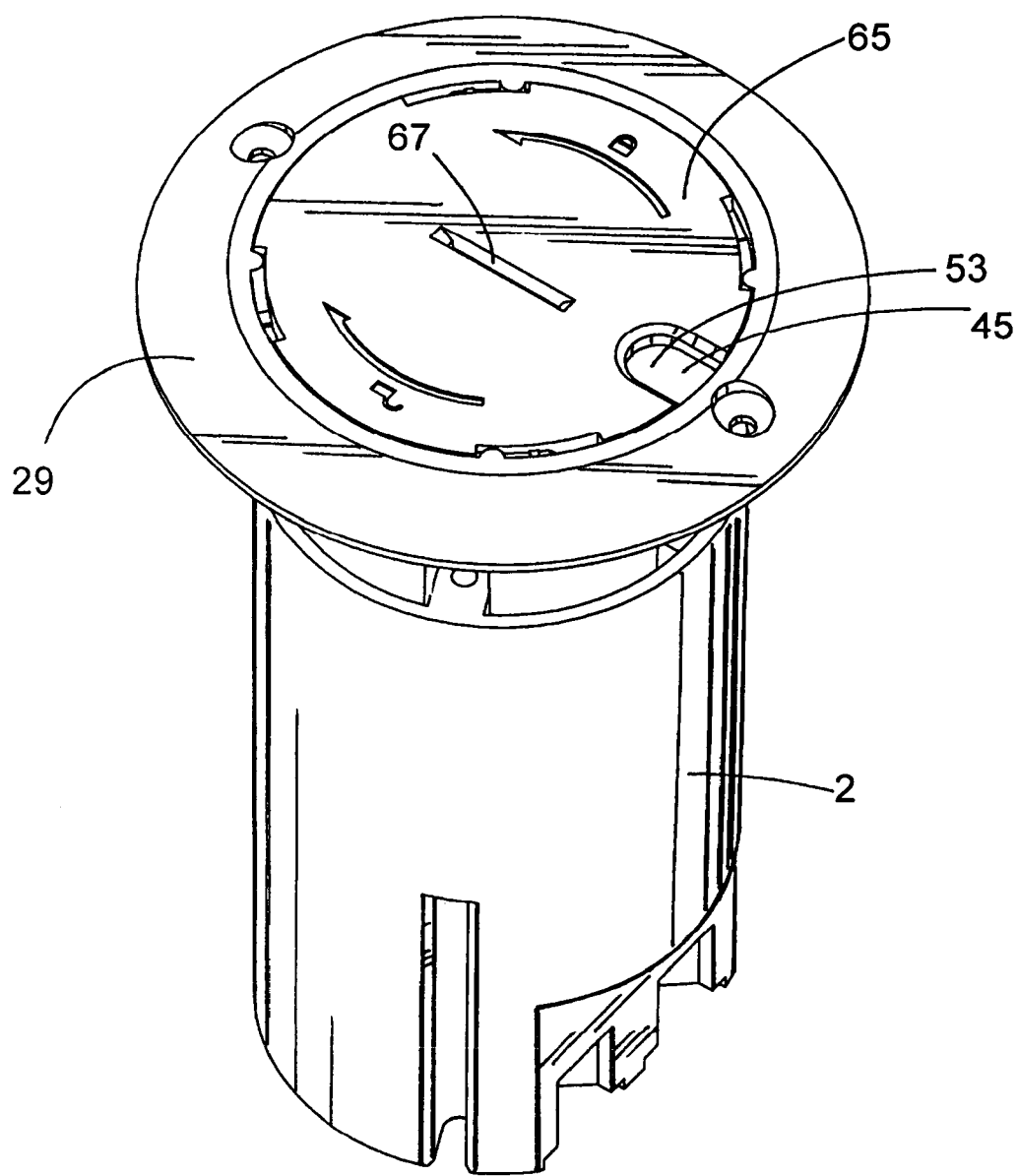
FIG. 5 is a perspective view of FIG. 1 assembled and in the locked-closed position.

The bottom wall 23 and cylindrical wall 25 of the termination housing 21 is designed to fit within the floor box housing 1, as shown in FIGS. 3–5. Therefore, the termination housing 21 and the floor box housing 2 are designed to provide the necessary contours and sizing to allow the termination housing 21 to fit and be functional within the floor box housing 2. For example, the termination housing 21 includes a pair of screw channels 33 which are diametrically opposed and similar to the screw channels 13 of the floor box housing 2. The two screw channels 33, 13 include screw holes 35, 15, respectively, which cooperatively provide an attachment mechanism to connect the floor box housing 2 to the termination housing 21 via pins or screws.

The floor box cover assembly 1 includes a ring assembly 29 which is located at the open end 27 of the termination housing 21, and is attached thereto by mechanical fastening or moldably formed from the termination housing. The ring assembly 29 and the cover 55 together provide a locking device and an opening/closing device. The locking device allows the cover 55 to be secured to the ring assembly 29. The open/close device allows wires to enter through an opening into the termination housing interior 31 while the cover 55 is closed and locked onto the ring assembly 29, as well as, allowing the opening to be blocked or sealed to prevent wires, or water from entering into the termination housing interior 31 when not in use.

FIG. 1 shows the ring assembly 29 as a molded unit which includes outwardly extending ring 37, a lip 39, and a skirt 41. The ring 37 is generally annular. The ring 37 extends outwardly from the perimeter of the cylindrical wall 25 of the termination housing 21. FIGS. 1, 3 and 5 show the ring 37 includes a protrusion, such as a tongue 45, to block an opening in the cover 55. The tongue 45 is an inwardly projecting piece, and it may be a free standing planar projection, or as shown in FIG. 3, the tongue 45 may be supported by the cylindrical wall 25 of the termination housing 21.

A lip 39 extends perpendicularly around the outer perimeter of ring 37. The lip 39 includes at least two tabs 51 which project inwardly toward the termination housing interior 31. The tabs 51 assist in locking the cover 55 to the ring assembly 29. FIG. 3 shows four tabs 51 spaced about the upper edge of the lip 37.

The lip 39 connects ring 37 to skirt 41. The skirt 41 is an outwardly projecting flange which is annular in shape. The skirt 41 provides a substantially smooth transition from a floor in which the floor box housing 2 and floor box cover assembly 1 is inset. The skirt 41 includes holes 49 to allow fasteners therethrough, securing the ring assembly 29 to the floor/support structure in which it extends thereover.

Figure 7:
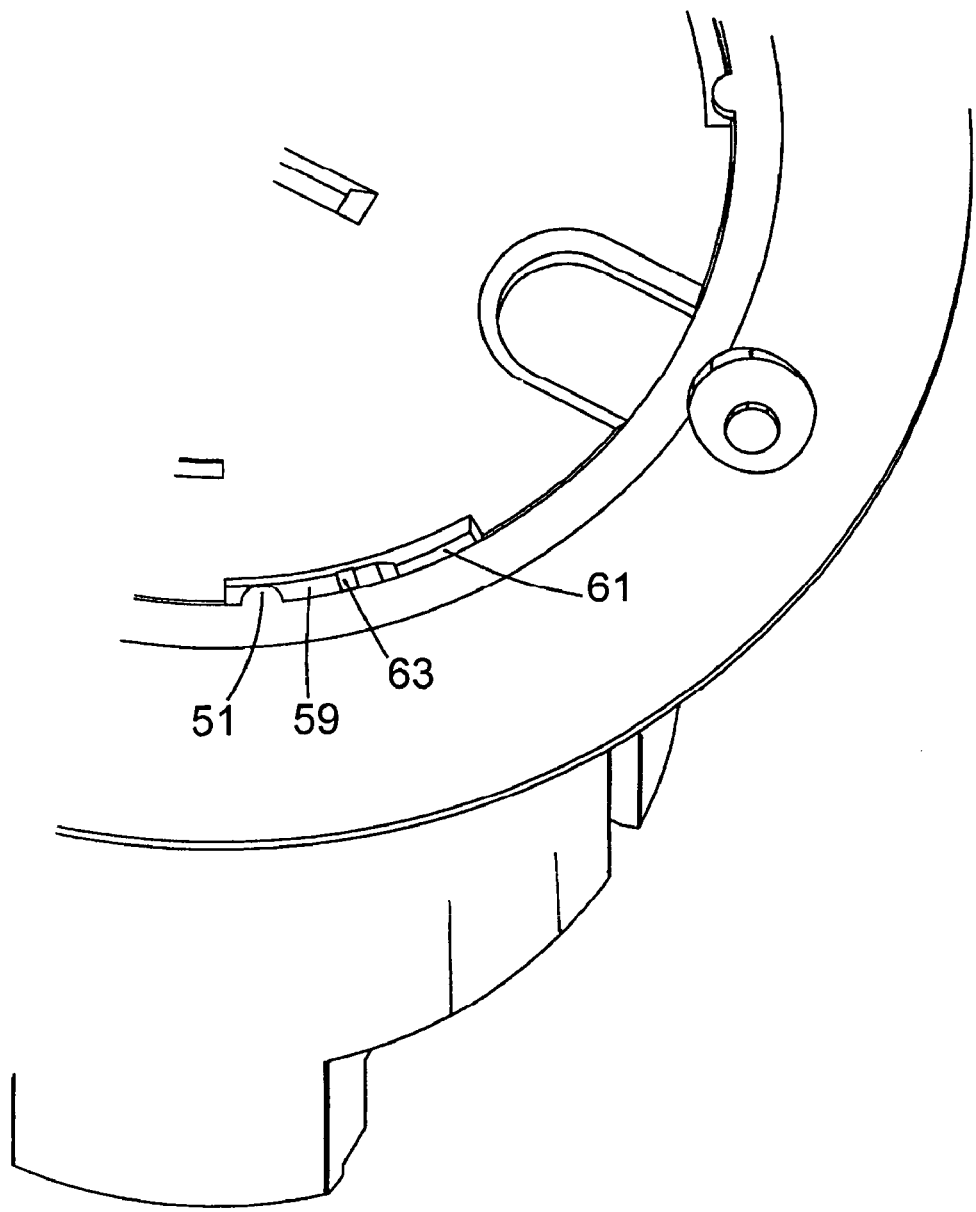
FIG. 7 is an exploded perspective view of the locking mechanism of FIG. 1 in the locked state.

As above mentioned the floor box cover assembly 1 includes a wholly removable cover 55 which is generally a planar circular member including at least two locking slots 61 and engagement member 59. The locking slots 61 and engagement members 59 are used in conjunction with the tabs 51 of the lip 39 to detach and re-attach the cover 55 to the termination housing 21. The locking slots 61 are located about the circumference of cover 55 so that cover 55 may be rotated before being re-attached to ring assembly 29 via tab 51. As shown in FIG. 3, the engagement member 59 further includes a ramped protrusion 63 for slidably engages tab 51 to lock the cover 55 thereto, as shown in FIGS. 5 and 7. The ramped protrusion 63 is wedged-shaped having a lead-in geometry portion and a flat stopper portion. The lead-in geometry portion guides the tab 51 over the protrusion 63. The flat stopper portion prevents the tab 51 from sliding back over the protrusion 63 and unlocking the cover 55 without manual manipulation.

The cover 55 further includes an access opening 53 to allow cables/wires to enter therethrough. The access opening 53 is a cut-away section of the cover 55. The access opening 53 is designed to provide an exit for the wire/cable cords 47 with limited space to prevent water to pass therethrough. The upper surface 65 of the cover 55 further includes marking, or etched instructional information, for example, showing directional indicators for locking or unlocking the cover 55. Additionally, the upper surface 65 includes a key slot 67 which allows one to use a tool, such as a screwdriver, within the key slot 67 to rotate the cover 55 from the locked to the unlocked position or vice-versa.

As shown in FIG. 3, a gasket 69 may be used which attaches to the cover 55 to provide additional water prevention. The gasket 69 includes a cut-out portion 71 similar to the access opening 53, such that the gasket 69 doesn't interfere with wires/cables exiting therethrough, as shown in FIGS. 1 and 2. The gasket 69 may be attached to the cover 55 by heat adhesion, such as lamination, or mechanical adhesion, such as glues, tapes, screws and the like.

The assembled floor box cover assembly 1 is shown in FIGS. 3–7. The assembly of the floor box cover assembly 1 into a floor is generally described herein. The power wires are fed through the ports 11 of the floor box housing 2 and to the electrical terminations attached to the bottom wall 23 of the termination housing 21.

Figure 6:
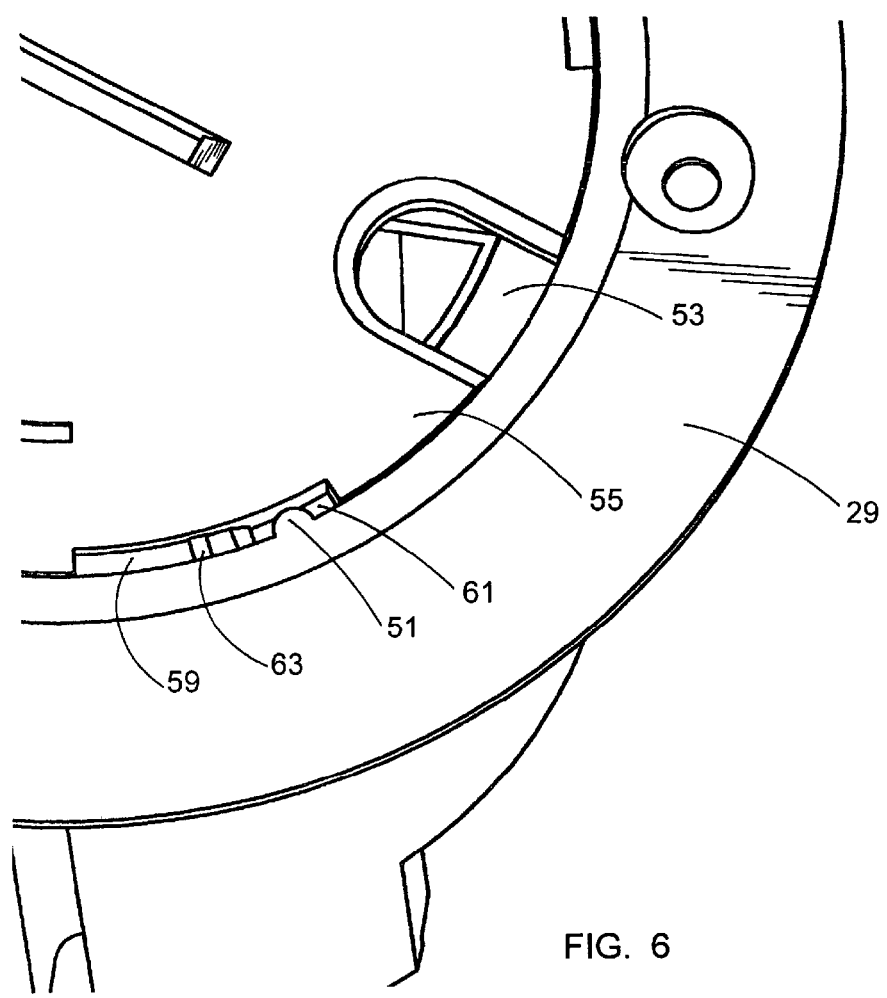
FIG. 6 is an exploded perspective view of the locking mechanism of FIG. 1 in the unlocked state.

The gasket 69 is attached to the under side of the cover 55. The cover 55 is placed onto the ring 37 of the ring assembly 29 by aligning the tabs 51 of the ring assembly 29 with the locking slots 61 as shown in FIG. 6. The cover 55 is rotated, via the key slot 67, counter clockwise to lock the cover and clockwise to unlock the cover, as shown in FIG. 5. As the cover 55 is rotated counter clockwise, the locking slot 61 moves away from the tab 51 and is replaced with the engagement member 59 of the cover 55. The ramped protrusion 63 crosses under the tab 51 locking the cover 55, as shown in FIG. 7. The ramped protrusion 63 prevents the tab 51 from inadvertently slipping into the locking slot 61 and unlocking the cover. The cover 55 may be positioned at four different locations, one being a closed-locked position, and three being an open-locked position depending on the orientation of the tabs 51 with the various locking slots 61. The various cover orientations provides the user flexibility in the location of the exiting cables 47. FIG. 4 shows the cover 55 in the open-locked position having the cover 55 locked onto the ring assembly 29 and a cable 47 exiting through the access opening 53 of the cover 55. FIG. 5 shows the cover 55 in the closed-locked position having the cover 55 locked onto the ring assembly 29 and the tongue 45 blocking the access opening 53 preventing water from entering the termination housing 21.

Referring now to FIGS. 8–14, a further embodiment of the present invention is shown. The embodiment of FIG. 8 employs a floor box housing (not shown) and a termination housing 121 of similar construction of floor box 2 and termination housing 21 shown in FIG. 1. Generally, a floor box housing is designed and of a construction to fit the termination housing 21 therein and attach thereto. Therefore, the contours of the floor box cover assembly 101 and termination housing 121 must be accounted for in the construction of the floor box housing of which it is partially enclosed and attached therein.

The termination housing 121 is similar to the termination housing 21 of FIG. 1 including a bottom wall 123 and an upstanding cylindrical wall 125 ending with an open end 127, as shown in FIGS. 8–12.

Figure 11:
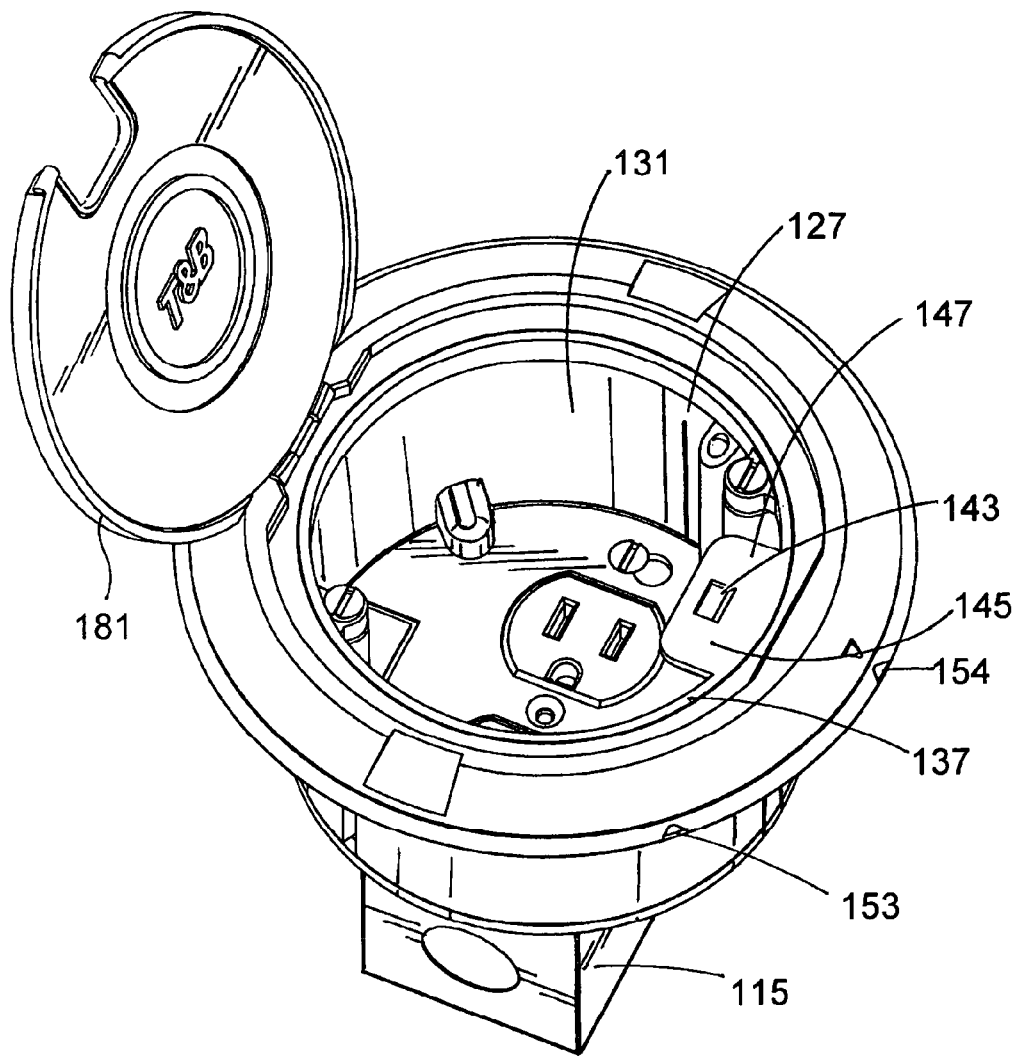
FIG. 11 is a perspective top view of FIG. 10 having the cover open.

FIG. 11 shows the termination housing 121 defines the termination housing interior 131 which permits the termination of both power and data/communication plugs therein. The bottom wall 123, as shown in FIG. 8, includes cut-outs 119 to provide access to the electrical terminations.

Figure 8:
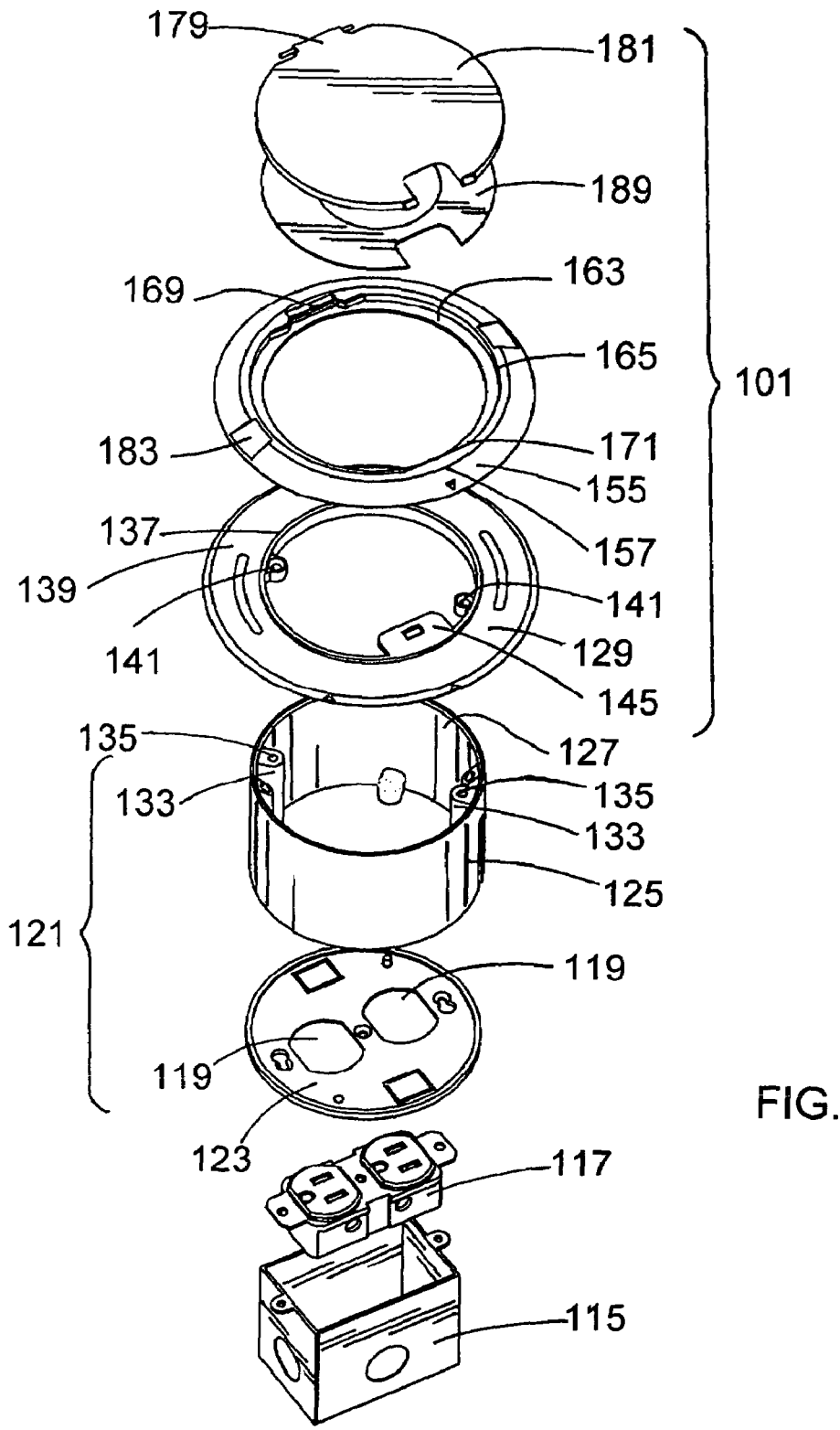
FIG. 8 is an exploded view of the second embodiment of the floor box cover assembly of the present invention.
Figure 9:
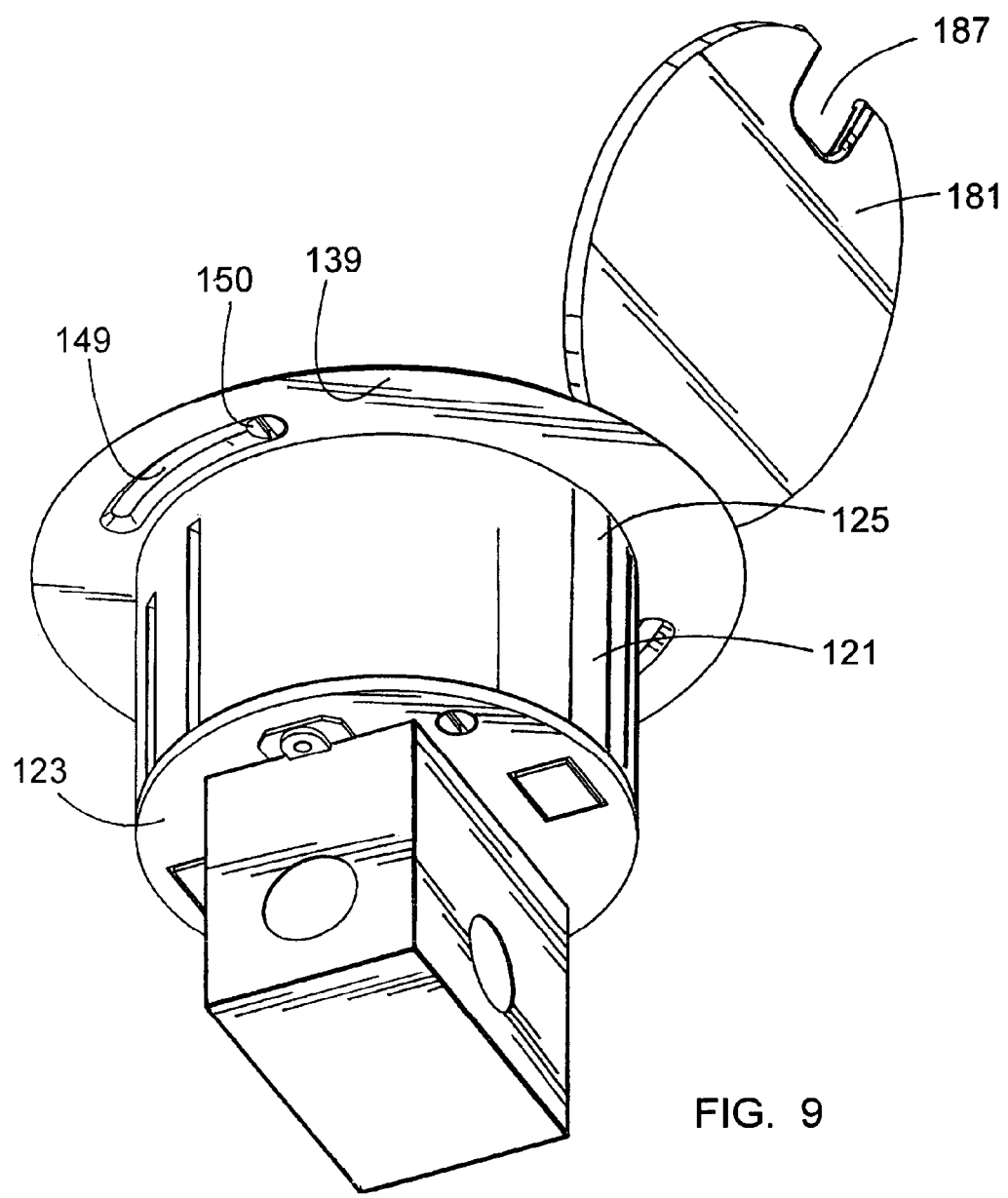
FIG. 9 is a perspective bottom view of a floor box cover assembly of FIG. 8.

FIGS. 8 and 11 show a power receptacle 117 and accompanying standard electrical box 115. The power receptacle 117 and box 115 are attached to the bottom wall 123 of the termination housing 121 by mechanical attachments such as fasteners or screws. Similarly, the bottom wall 123 is attached to the cylindrical wall 125 of the termination housing 121 by mechanical attachments such as screws, fasteners, glue or heat adhesion. Further, it is contemplated that the termination housing may be one molded piece instead of separately fastened elements.

Figure 12:
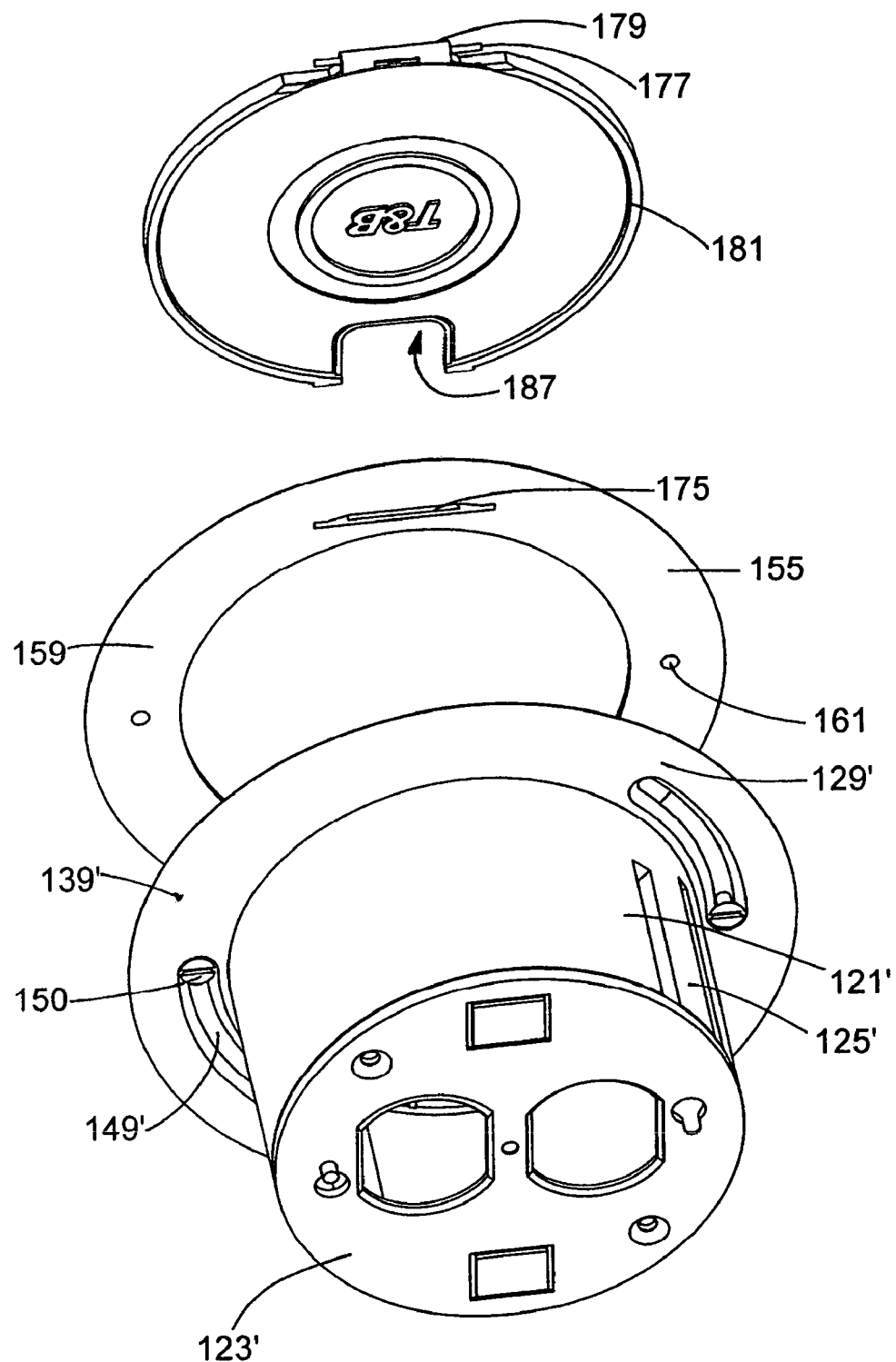
FIG. 12 is a perspective bottom view of a floor box cover assembly of the present invention having one molded portion including the termination housing and first ring assembly.
Figure 13:
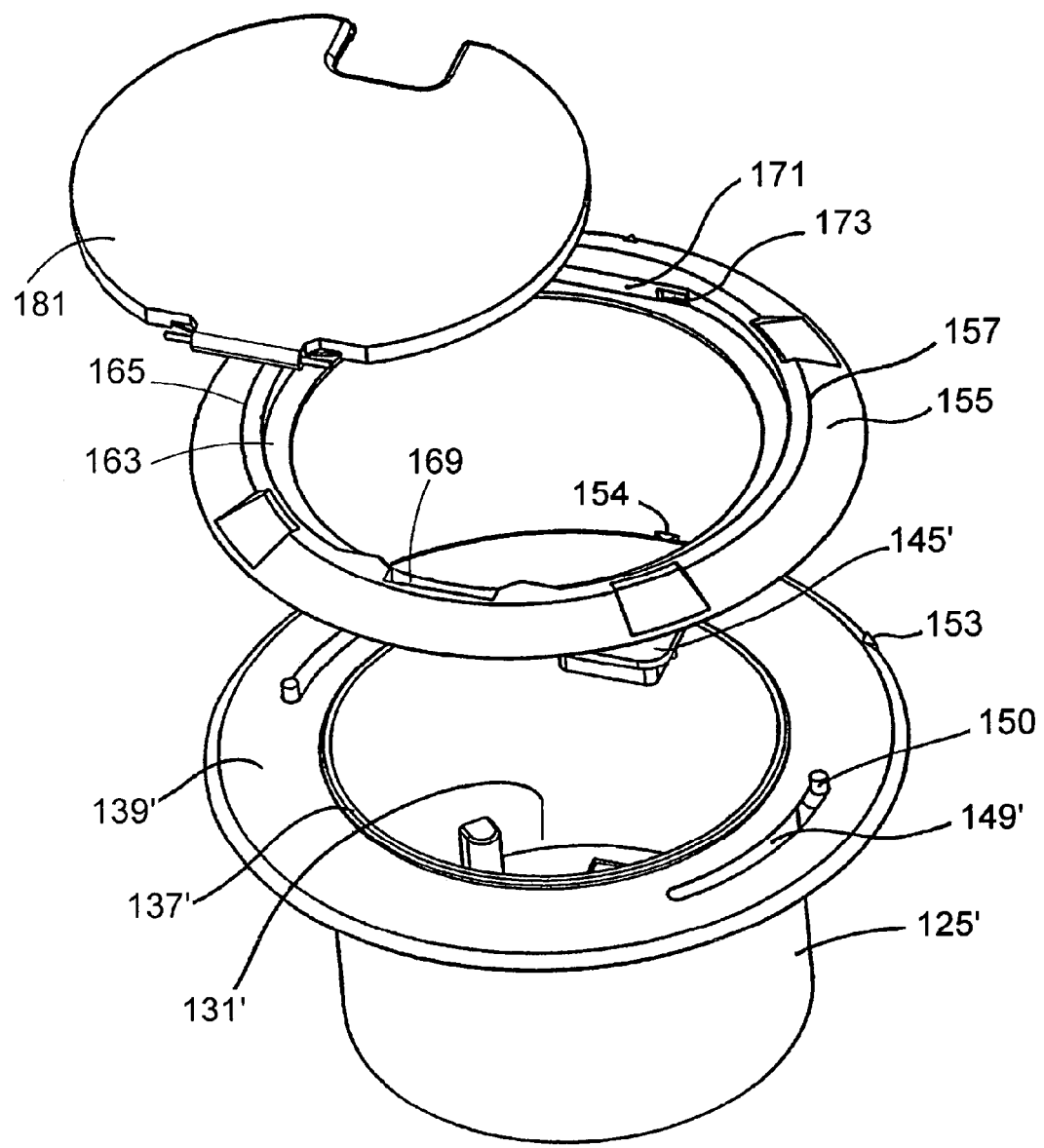
FIG. 13 is a perspective top view of FIG. 12.

As shown in FIGS. 8 and 11, the cylindrical wall 125 of the termination housing 121 include various screw channels 133 and screw holes 135 to provide attachment of the first ring 129 to the open end 127' of the cylindrical wall 125 as well as attachment to the bottom wall 123. However, as shown in FIGS. 12–13, it is also contemplated that the first ring assembly 129' is a moldable extension of the open end 127' of the termination housing 121'. The termination housing 121' and first ring 129' is similar to termination housing 121 and first ring 129 of FIGS. 8–11 except the attachment mechanism, screw channels and holes are not included as the termination housing 121' and first ring 129' is a molded unit. The floor box cover assembly 101 is similar to the cover assembly 1 of FIG. 1 in that the cover rotates to provide an opening for wires to enter therethrough and to rotate to a closed blocked position.

The floor box cover assembly 101 includes a first ring 129, 129', a second ring 155 and a cover 181.

FIGS. 8 and 13 show the first ring assembly 129, 129' includes an upwardly extending inner lip 137, 137' and an outwardly extending flange 139, 139' depending therefrom. The inner lip 137, 137' is annular and rises above the flange 139, 139', and defines the inner diameter of the ring 129, 129'. FIGS. 8 and 13 show lip 137, 137' further including tongue 145, 145' which is an inwardly projection of the lip 137, 137'. The tongue 145, 145' may be similar to tongue 45 of FIG. 1, and a blocking mechanism to seal or close off the access opening of the cover when there are no wires exiting therethrough. As shown in FIG. 11, and similarly constructed in the first ring 129', the tongue 145, 145' is a substantially planar projection with a top surface 147 and a divot 143 therein.

FIGS. 8 and 11 show inner lip 137 of the first ring 129 which includes a pair of attachment mechanism 141 that are diametrically opposed and extending inwardly of the diameter of the lip 137. A fastener, such as a screw, together with the attachment mechanism 141 and screw channel 133 of the termination housing corporately attach the first ring 129 to the termination housing 121.

An outwardly extending flange 139, 139' depends from the lip 137, 137' and extends outward and perpendicular from the outer circumferential surface of lip 137, 137'. The flange 139, 139' extends far enough beyond the perimeter of the floor box housing (not shown) open upper end to prevent the flange 139, 139' from entering therein. The flange 139, 139' rests on top of the floor box open upper end while the termination housing 121, 121' fits inside of the floor box, similar to the arrangement of ring 37 of the first embodiment. The flange 139, 139' includes a pair of elongated holes 149, 149' therethrough in which a portion of a pin or screw 150 enters therein to connect the second ring assembly 155 to the first ring 129, 129' and allow for the rings to rotate about each other. Further, the flange 139, 139' has indicators 153, 154 to show the floor box cover assembly in 101 in the open or close position, respectively. The indicators 153, 154 may be protrusion arrows, indented arrows, or various markings.

FIGS. 8, 12 and 13 show the second ring 155 which attaches to the first ring 129, 129' and rotates about ring 129, 129'. The second ring 155 has a top surface 157 and a bottom surface 159. FIG. 12 shows the bottom surface 159 is essentially planar having two pin holes 161 to correspond with the elongated holes 149, 149' of the first ring 129, 129'. Pin 150 and holes 161 corporatively connect the second ring 155 to the first ring 129, 129'.

FIGS. 8 and 13 show the top surface 157 of the second ring 155 having various contours. The second ring 155 is defined as inner substantially planar loop 163 and elevated wedge 165 about the loop 163.

Figure 14:
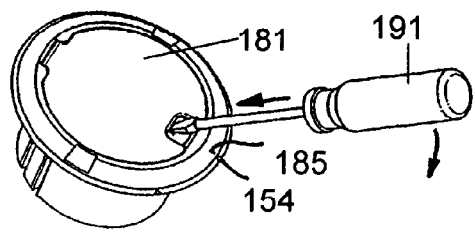
FIG. 14, 14A–E is a perspective top view of FIG. 8.

The inner planar loop 163 is substantively annular and supports a cover 181 there upon. The wedge 165 extends upwardly and circumferentially outward from the loop 163. The wedge 165 includes a female connection 169 and a flattened portion 171. FIG. 13 shows flattened portion 171 includes indentations 173 to assist in retaining or locking the cover 181 in a closed position. FIG. 12 shows the bottom surface 159 of the second ring 155 includes pin slot 175, and top surface 157 is shown with pin slot 175 in FIG. 8. The pin slot 175 in the female adaptors 169 together with pin 177 and a male adaptor 179 of the cover 181 provide a pivotal cover connection. The wedge 165 further includes cut-outs 183 about the surface to assist in manual rotation of the second ring 155 about the first ring 129, and an indicational mark 185 visually indicates the slidable opened position or closed position of the cover 181 as shown in FIG. 14 (14A–14E). The cover 181 is attached to the second ring 155 and is inset about the wedge 165 such that the rise of wedge 165 is even and creates a flat, level surface with the cover 181 when assembled.

As shown in FIG. 8, cover 181 is generally a planar substantially circular member including a male adaptor 179 and access opening 187 to allow cables/wires to enter therethrough. The access opening 187 is a cut-away section of the cover 181. The access opening 187 is designed to provide an exit for the wire/cable cords therethrough without the cover 181 being opened. Access opening 187 is designed to provide limited space when wires are exiting therethrough to resist water from passing therethrough.

Figure 10:
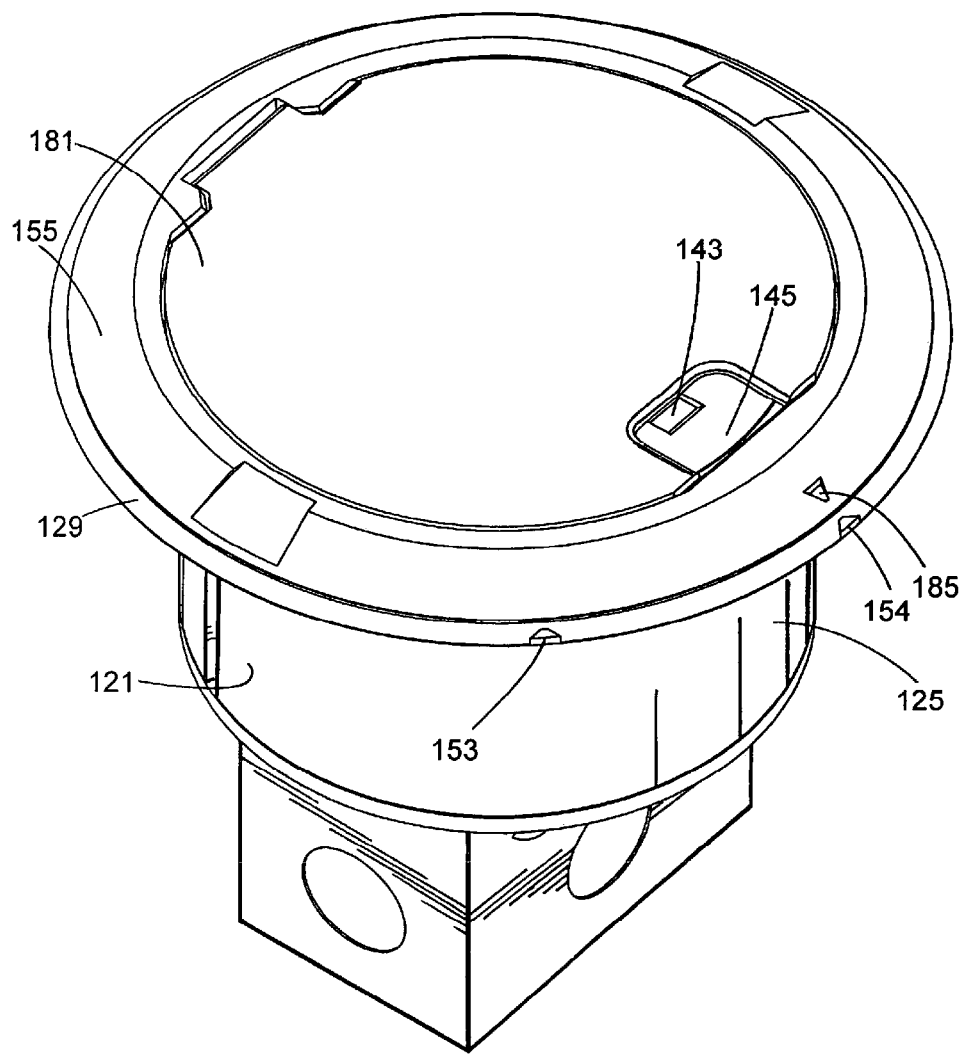
FIG. 10 is a perspective top view of FIG. 9.

As shown in FIGS. 10 and 11, the male adaptor 179 fits with the female adaptor 169 of the second ring 155. FIGS. 12–14 (A–E) show a pin 177 is used to engage both the cover 181 and second ring 155 to provide a pivot connection through the male adaptor 179 and female adaptor 169.

As shown in FIG. 8, a gasket 189 may be used which attaches to the cover 181 to provide additional water prevention. The gasket 189 includes a cut-out portion similar to the access opening 187, such that the gasket 189 doesn't interfere with wires/cables exiting therethrough. The gasket may be attached to the cover by heat adhesion, such lamination, or mechanical adhesion, such as glues, tapes, screws and the like.

Figure 14A:
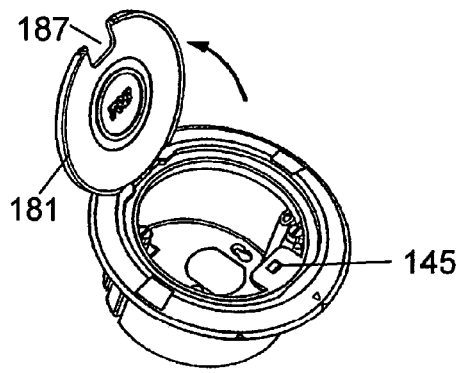
Figure 14B:
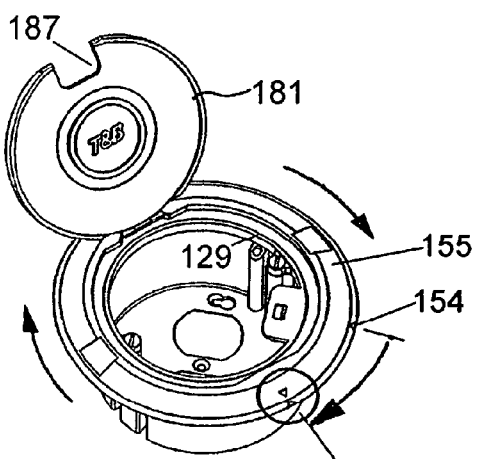
Figure 14C:
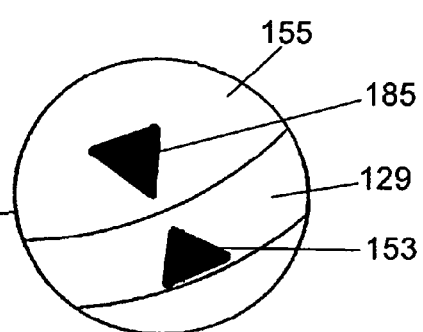
Figure 14D:
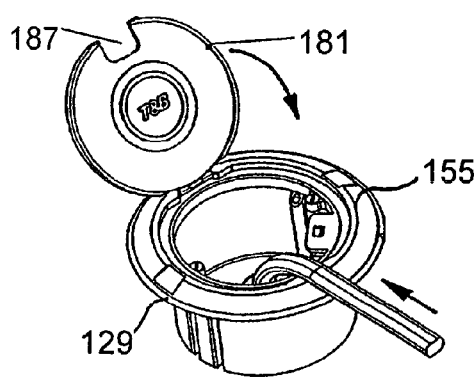
Figure 14E:
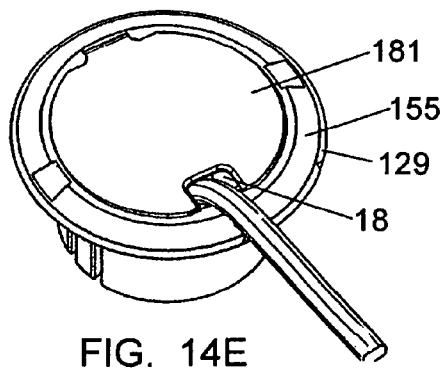

FIG. 14, 14A–14E show the assembled floor box cover assembly 101 and function thereof. FIG. 14 shows the floor box cover assembly 101 in the closed-locked position. The cover 181 is locked and the access opening 187 is closed or blocked by tongue 145 preventing water or objects therethrough. The alignment of indication marks 154 and 185 provide visual indication of the closed-locked position. FIG. 14 shows tool 191 being placed in the divot 143 to pivotally open the cover 181. The tool 191 is used to disengage the cover 181 with the flattened portion 171 and indents 173 of the second ring 155. FIG. 14A shows cover 181 pivotally opened. FIGS. 14B and 14C shows second ring 155 is rotated clockwise about first ring 129 to the open position as indicated by the alignment of markers 153 and 185. FIG. 14D shows a wire/cable entering and attached to termination connection within the box 121 and exiting the termination housing interior 131. FIG. 14E shows the cover 181 closed allowing the wire/cord to exit the termination housing 121 through the access opening 187.

Figure 15:
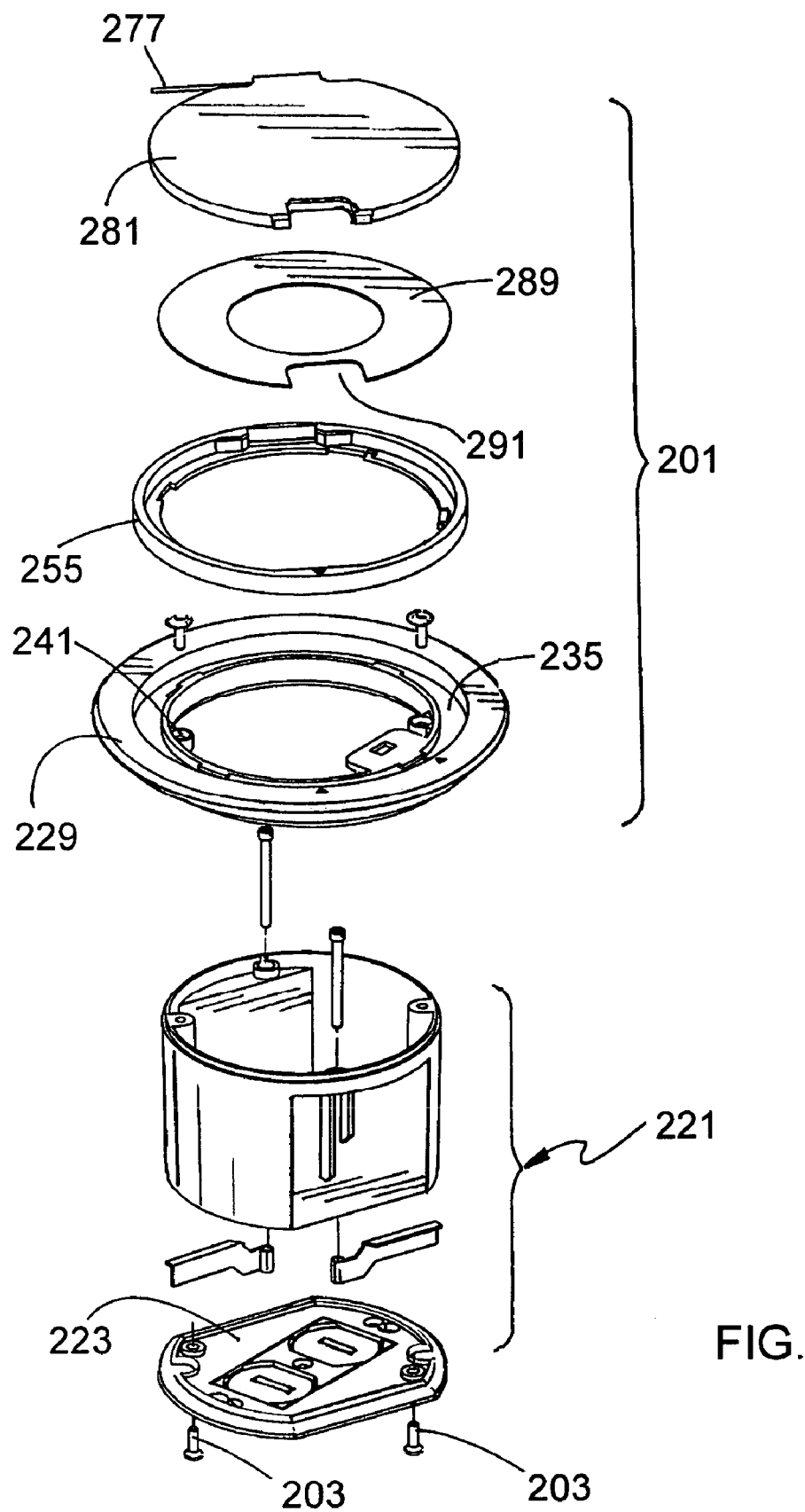
FIG. 15 is an exploded view of third embodiment of the floor box cover assembly and termination housing of the present invention.

Referring now to FIGS. 15–25, a further embodiment of the present invention is shown. The floor box cover assembly 201 of FIG. 15 is similar to floor box cover assembly 101 of FIG. 8, including a duel rotational ring system to open or close a port hole into the termination housing. The embodiment of FIG. 15 employs a termination housing 221 and a floor box housing (not shown) of similar construction of floor box 2 shown in FIG. 1, and termination housing 21 and 121 of FIGS. 1 and 8, respectively.

Floor box cover assembly 201 includes a first ring 229, a second ring 255 and cover 181. Further, first ring 229 is similar to first ring 129 of FIG. 8, by providing an access blocking member and a connectable rotational mechanism.

Second ring 255 is similar to second ring 155 of FIG. 8 by providing a pivotal cover attachment member and cover locking mechanism. Furthermore, cover 281 is similar to cover 181 of FIG. 8 by pivotally attaching to second ring 255 and having an access opening.

Generally, a floor box housing is designed and of a construction to fit the floor box cover assembly 201 and termination housing 221 inside and attach thereto, as above-discussed in reference to floor box cover assembly 101 and floor box 2.

FIGS. 15–18 show the termination housing 221, which is similar to the above-described termination housing 121 in FIG. 8, having a bottom wall 223 and depending side wall 225 about the perimeter of the bottom wall 223. The termination housing 221 defines the termination housing interior 231 which permits the termination of both power and data/communication plugs therein. The bottom wall 223 is substantially oblong in shape having two opposing sides substantially parallel and linear; and two opposing sides substantially curved or arched. FIGS. 15 and 16 show bottom wall 223, including cut-outs 217 to provide access to the electrical terminations, such as a power receptacle and associated standard electrical box (not shown).

Figure 17D:
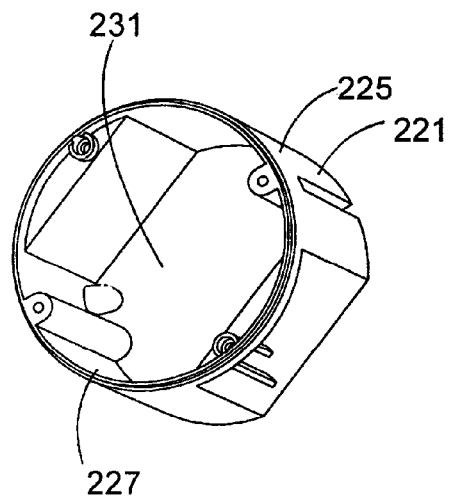
FIG. 17D is a top perspective view of the side wall of FIG. 17.
Figure 17C:
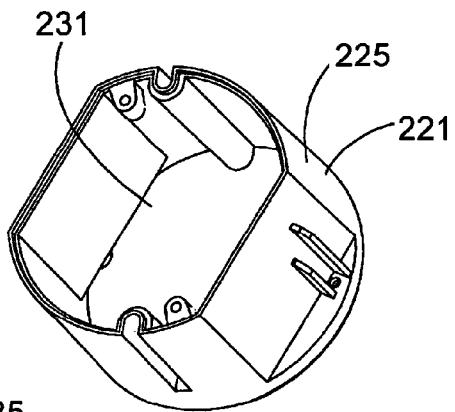
FIG. 17C is a bottom perspective view of the side of FIG. 17.
Figure 17A:
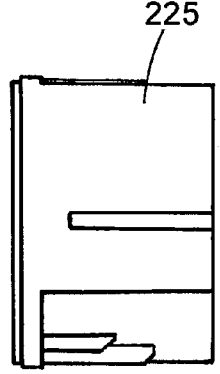
FIG. 17A is a side profile of the side wall FIG. 17.
Figure 17:
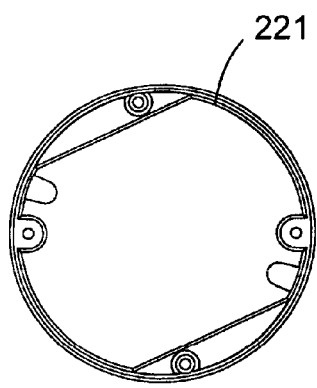
FIG. 17 is a bottom view of the side wall of the termination housing of FIG. 15.
Figure 17B:
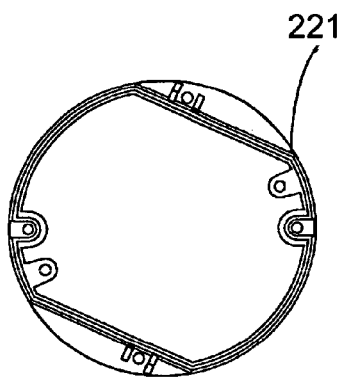
FIG. 17B is a top view of the side wall of FIG. 17.

As shown in FIGS. 15 and 17, the side wall 225 of the termination housing 221 include various screw channels 233 and screw holes to provide attachment of the first ring 229 to the termination housing 221. However, as above-discussed in reference to termination housing 121, it is also contemplated that the first ring may be a moldable extension of the termination housing. Further, it is contemplated that different termination housing designs and configuration, as known in the art or previously described herein, may be used and adapted to attach to the floor cover assembly 201 below-described.

FIGS. 15 and 19 show the first ring 229 having an upwardly extending inner lip 237, a recessed planar disk 235 and an outwardly extending flange 239. The inner lip 237 is generally cylinder-shaped and defines the inner diameter of the first ring 229, and extends below and above the recessed disk 235 as shown in FIGS. 19A and 19C. FIGS. 15 and 19 show lip 237 includes tongue 245 which is an inwardly projection of the lip 237 and a substantially planar with a top surface 247 and a divot 243 therein. Tongue 245 is similar to tongue 145 of floor box cover assembly 101 and designed to block an access opening 287 in cover 181 to prevent water and objects therethrough during non-use of the floor box assembly 201.

FIGS. 19, 19B and 19C show the inner lip 237 further including a pair of attachment mechanism 241, which are diametrically opposed and extending inwardly of the inner perimeter of the lip 237. A fastener, such as a screw, together with the attachment mechanism 241 and screw channel or other attachment mechanism of the termination housing corporately attach the first ring 229 to the termination housing 221.

The inner lip 237 further includes two pairs of diametrically opposed tabs 209 extending outward from the circumference of the inner lip 237, as shown in FIGS. 19 and 19C. The tabs 209 are designed to cooperatively engage with the second ring 255 to connect the two rings (229, 255) together, and provide a mechanism to lock/unlock the second 255, similar in function to the tabs 51 and the engagement member 59 of cover 55 of FIG. 1 as above-discussed.

As shown in FIGS. 15 and 19 (A–C), the first ring 229 further includes a recessed planar disk 235 which connects the inner lip 237 to the outwardly extending flange 239. The inner lip 237 extends perpendicularly from the inner circumference of disk 235 and the flange 239 extends perpendicularly from the outer circumference of the disk 235. The recessed planar disk 235 is inset from the lip 237 and disk 235 creating a channel with the disk 235 being the bottom wall of the channel, and the lip 237 and flange 239 extending upwardly on either side of the disk 235 to define side walls. The disk 235 is inset to seat the second ring 255, providing a flat outer surface when the floor box cover assembly 201 is assembled.

Figure 22:
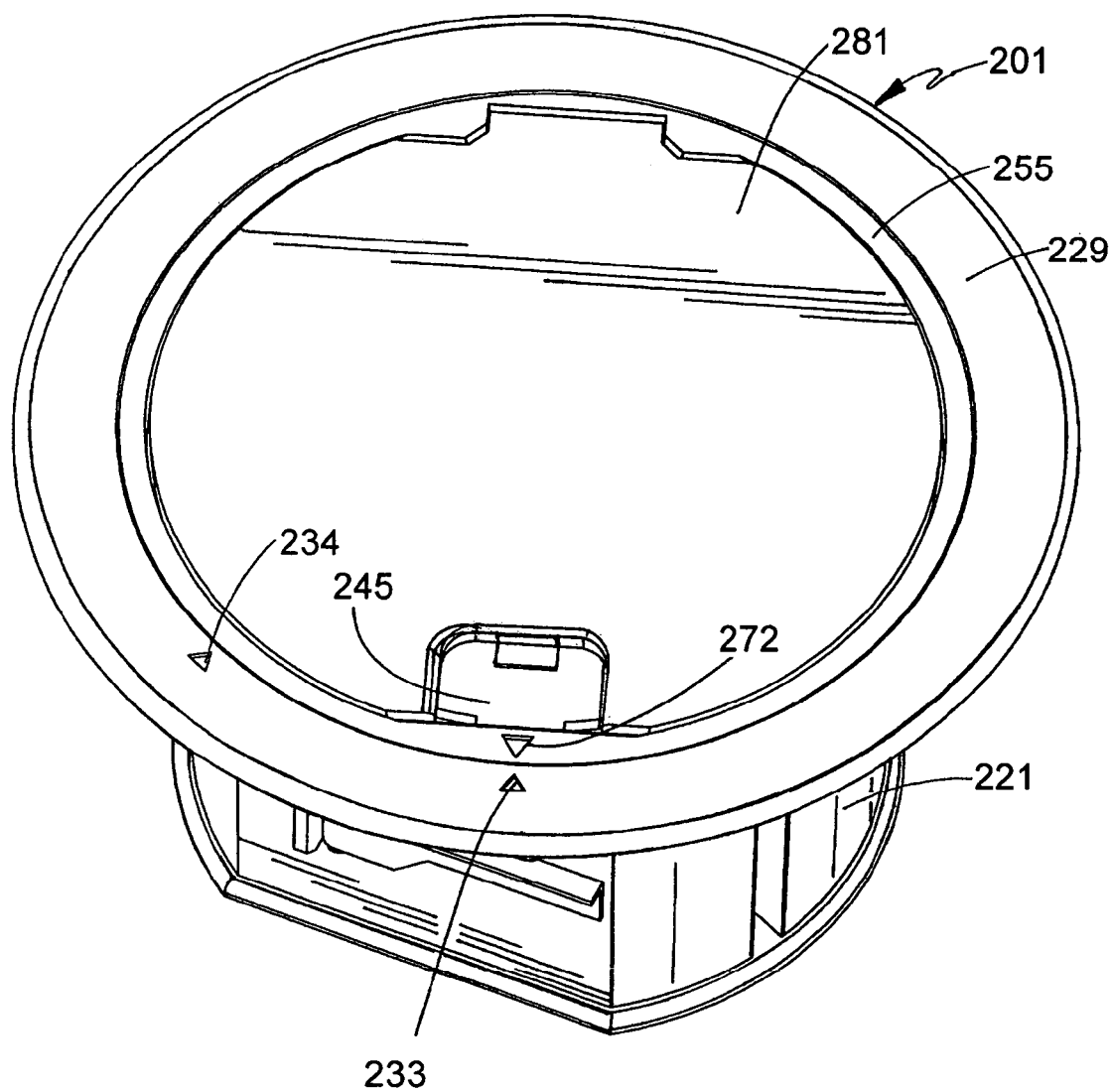
FIG. 22 is a perspective top view of the assembled embodiment of FIG. 15.
Figure 23:
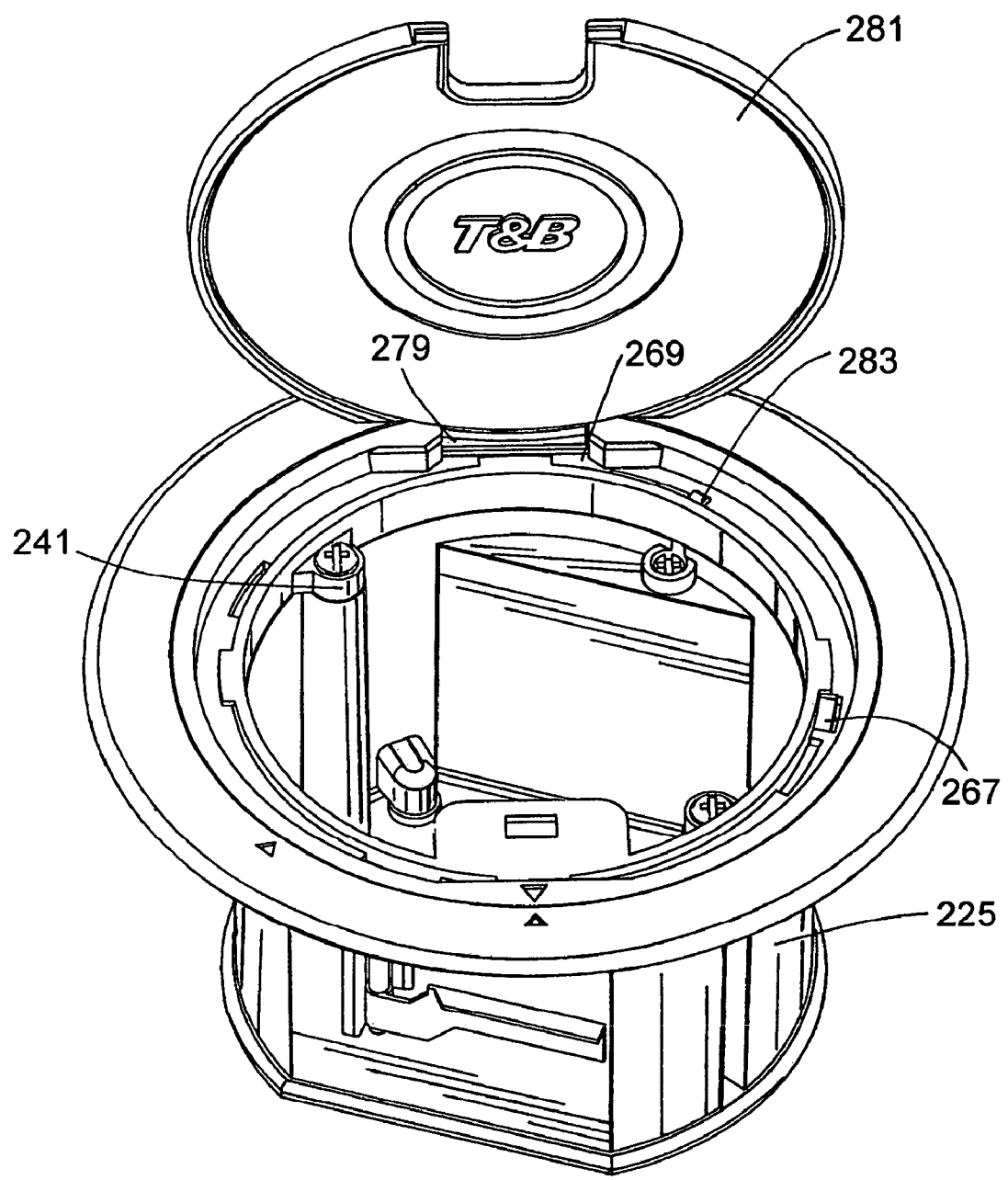
FIG. 23 is a perspective top view of the FIG. 22 with the cover opened.
Figure 24:
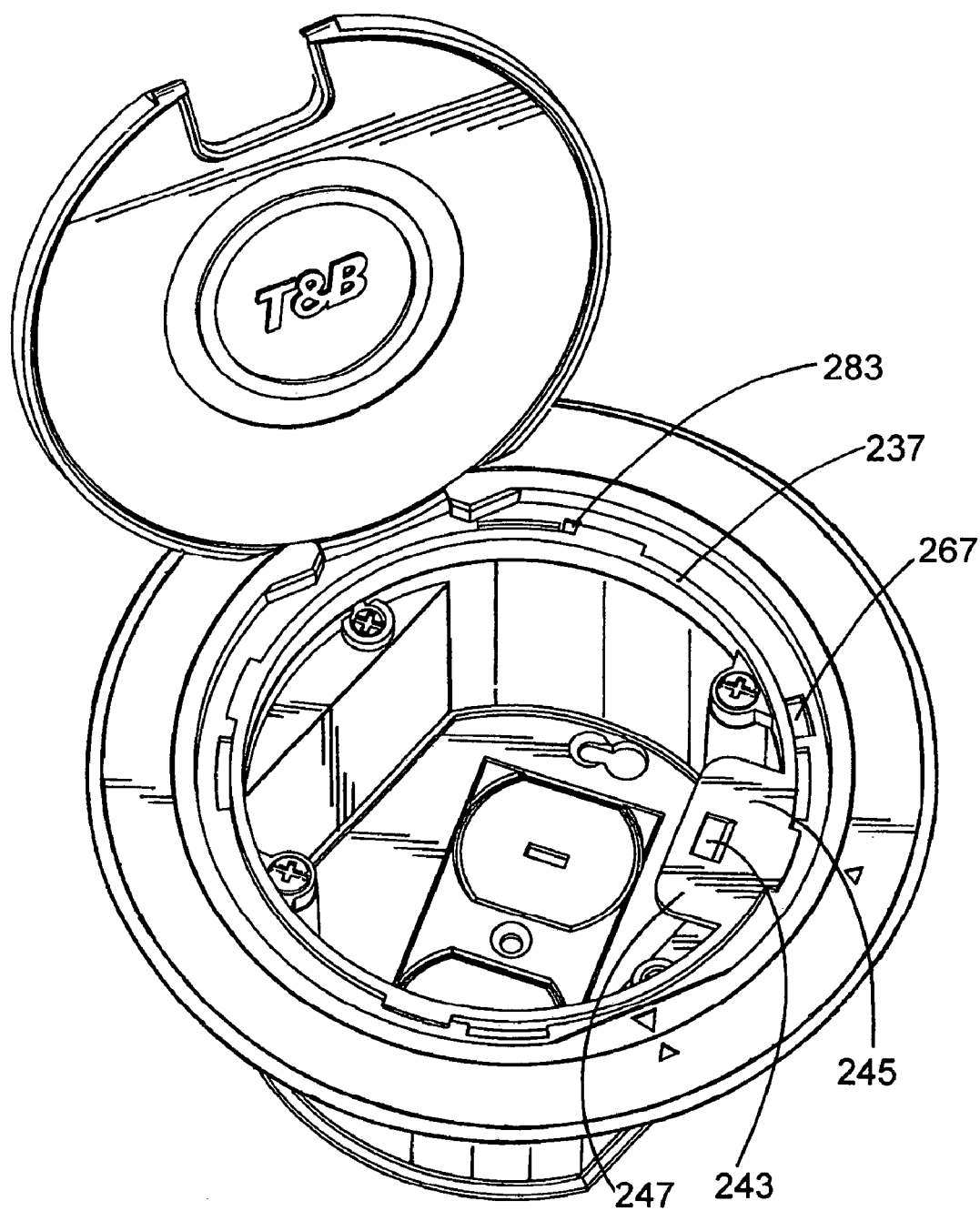
FIG. 24 is a perspective top view of the floor box cover assembly with the ring assembly rotated to the position to allow wires therethrough and the cover opened.
Figure 25:
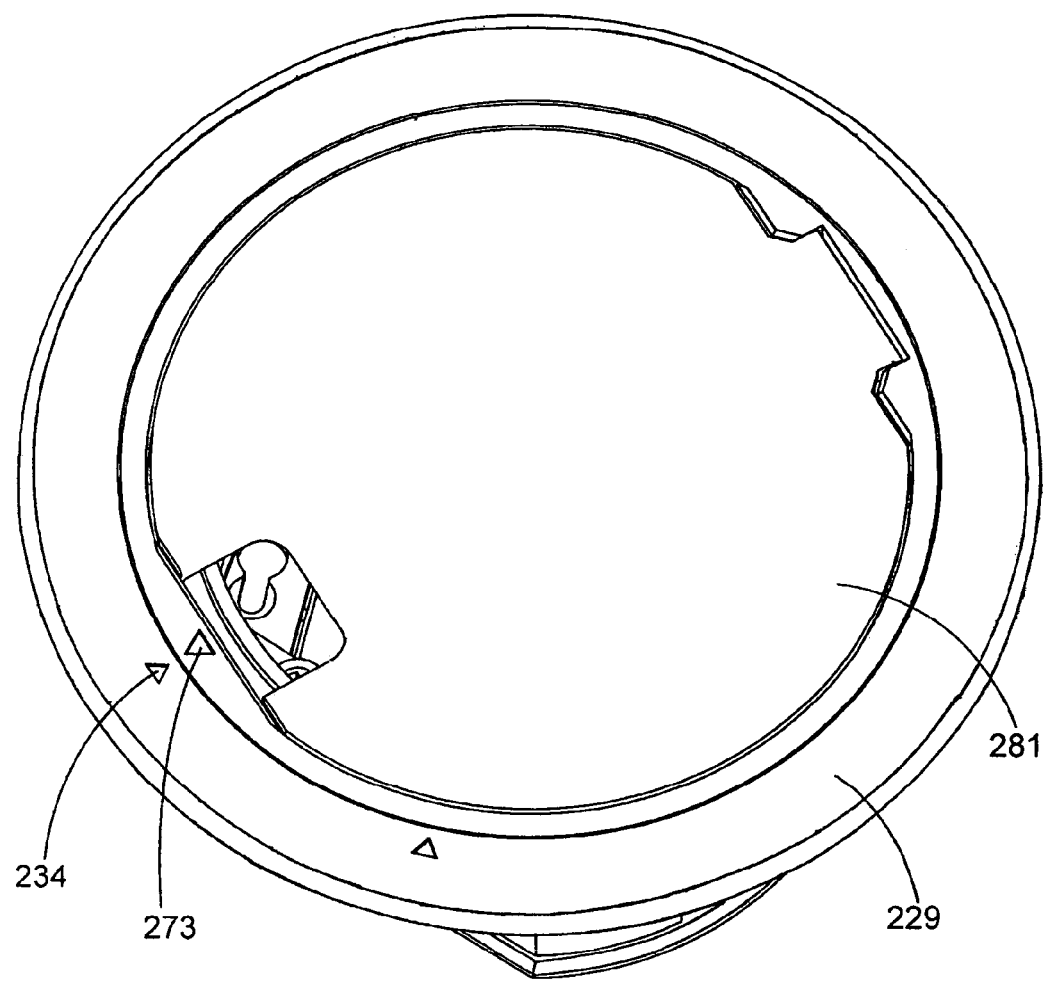
FIG. 25 is a perspective top view of FIG. 24 with the cover closed.

An outwardly extending flange 239 depends from the recessed disk 235 and extends upwardly and outwardly the perimeter of the disk 235. Further, the flange 239 has indicators 233, 234 to identify the position of the ring assembly 201 being in the closed or open position, respectively, as shown in FIGS. 22 and 25. The indicators 233, 234 may be protrusion arrows, indented arrows, or various markings.

FIGS. 15 and 20 (A–D) show the second ring 255 which cooperatively engages with the first ring 229 to rotate about first ring 229. The second ring 255 has a top surface 257 and a bottom surface 259. FIGS. 20 and 20C show the bottom surface 259 is essentially planar having two pairs of opposing tab slot 261 which cooperatively slip over the tabs 209 of the first ring 229. FIG. 20B shows top view of four recesses 261. Beside two adjacent recesses 261 is a rotational control mechanism to limit the rotation of the rings 229,255 about each other, similar in function as the engagement member 59 and tabs 51 of the floor box cover assembly 1; or the elongated holes 149, pin hole 161 and pin 150 of the floor box cover assembly 101. FIG. 20B shows the rotational control mechanism as a locking ramp 267 and a stopper 283. The locking ramp 267 has one-way lead-in geometry to guide a tab 209 of first ring 229 thereover when the second ring 255 is rotated clockwise only.

As the tab 209 rides over the locking ramp 267, the locking ramp 267 is forced downward under the tab 209. Once the tab 209 passes over the locking ramp 267, the locking ramp pops back upwardly blocking the tab 209 from riding over it again, without manual manipulation. Similar to the engagement member 59 as previously discussed in relation to FIG. 1.

FIGS. 20B and 20D show the top surface 257 of the second ring 255 having various contours and is defined as a generally inset tortoid 263 having an elevated rim 265 about the outer circumference.

The inset tortoid 263 is substantively annular and supports a cover 281 there upon. The rim 265 extends upwardly and circumferentially about the tortoid 263. The rim 265 includes a female adapter 269 and a flattened portion 271. The flattened portion 271 includes indentations 273 to assist in retaining the cover 281 in a closed position. FIG. 20 shows the bottom surface 259 of the second ring 255 includes pin slot 275 in the female adaptors 269. The female adaptor 269, pin 277 and a male adaptor 279 of the cover 281 provide a pivotal cover hinge connection. Additionally, the second ring 255 includes an indicational mark 285 to visually indicate the slidable opening position or closed position of the access opening 287 of the cover 281 about the first ring 229 as shown in FIGS. 22 and 25. The second ring 255 and cover 281 is similar in function and attachment design as the second ring 155 and cover 181 of FIG. 8. The cover 281 is attached to the second ring 255 and is inset about the rim 265 such that the rise of rim 265 is even with the top surface of the cover 281, creating a flat surface once the floor box assembly 201 is assembled, as shown in FIGS. 22 and 25.

Figure 21:
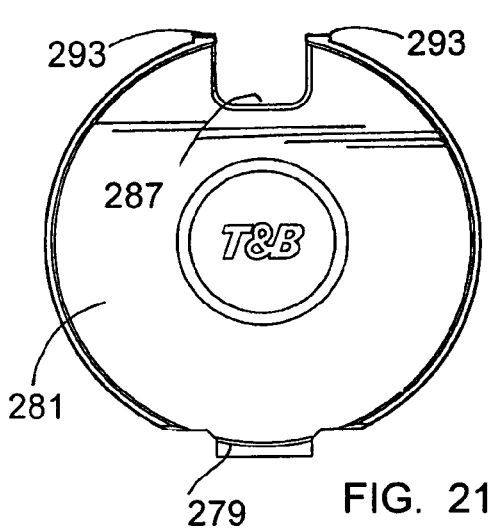
FIGS. 21 and 21C is a bottom view of the cover of FIG. 15.
Figure 21A:
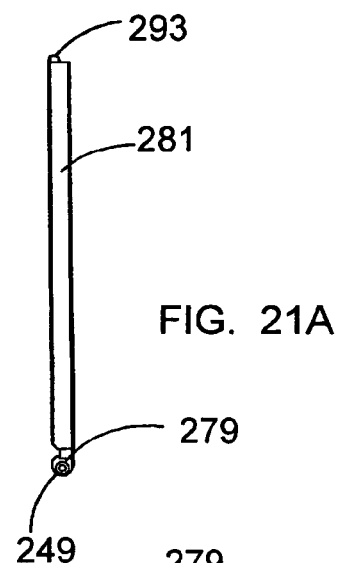
FIG. 21A is a side profile view of the cover of FIG. 15.

As shown in FIGS. 21(A–D), cover 281 is similar to cover 181 of FIG. 8, being generally a planar substantially circular member including a male adaptor 279 an access opening 287 to allow cables/wires to enter therethrough. The access opening 287 is an indenture in the cover 281. The access opening 287 is designed to provide an exit for the wire/cable cords with limited space to prevent water from passing therethrough. The male adaptor 279 has a pin hole 249 therethrough, as shown in FIG. 21A for allowing a pin therethrough.

FIGS. 22–25 show the male adaptor 279 that fits into the female adaptor 269 of the second ring 255 and a pin pivotably attaches the cover 281 to the ring 255.

Figure 21B:
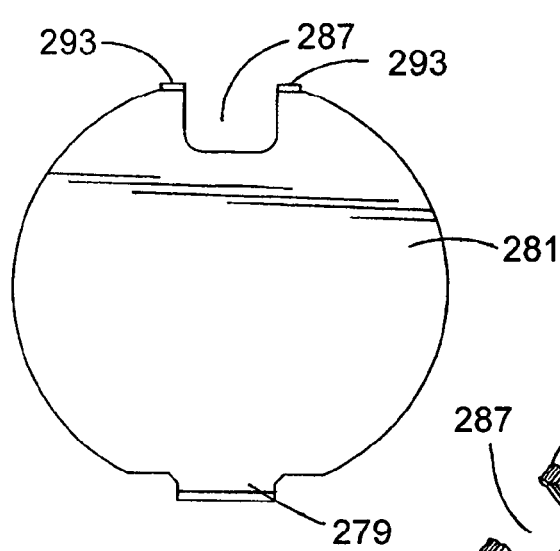
FIGS. 21B and 21D is a top view of the cover of FIG. 15.
Figure 21C:
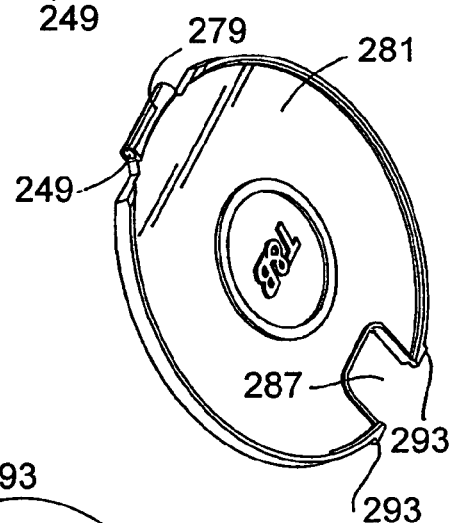
Figure 21D:
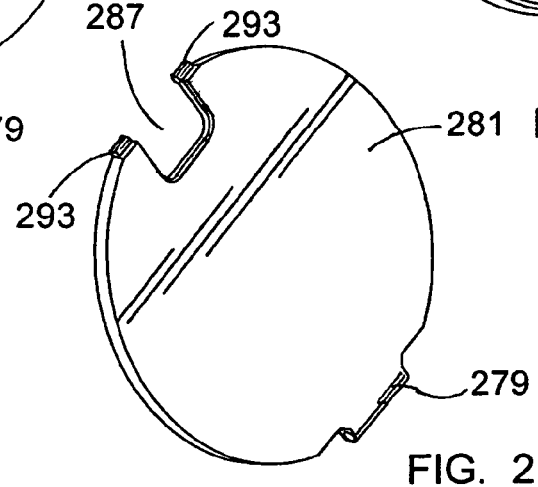

FIGS. 21B and 21D show cover 281 further includes beads 293 on either side of access opening 287, which assist in locking the cover 281 in a closed position when the beads 293 engage with, and protruded into the indentations 273 of the second ring 255.

FIG. 15 shows a gasket 289 may be used which attaches to the cover 281 to provide additional water prevention. The gasket 289 includes a cut-out portion similar to the access opening 287, such that the gasket 289 doesn't interfere with wires/cables exiting therethrough. The gasket may be attached to the cover by heat adhesion, such lamination, or mechanical adhesion, such as glues, tapes, screws and the like.

Having described the components of the present invention, the assembly and use of the present invention may be described herein. The floor box housing is first positioned into the floor as known in the art. For example, the floor box housing is positioned onto an understructure of a floor which is to be constructed. Concrete is poured thereabout in conventional fashion. Once the floor is set, the upper end of the cylindrical wall may be cut to a desired height. The height selected is based upon the type of devices terminated by floor box assembly as well as the type of floor covering employed over the poured floor. However, typically the wall is cut substantially flush with the floor.

Power and data/communication wires may now be run into the interior of floor box housing through ports and located at the lower end thereof.

After the floor box is in place the wires are terminated in the termination housing 221 by first pulling the wires through a standard electrical box and terminating them at the receptacle. The termination housing bottom wall 223 is connected to the receptacle. The side wall 225 of the termination housing is attached to the bottom wall 223 using screw channels and screws therethrough. The assembled termination housing 221 is then placed inside the floor box housing and attached thereto.

Once the termination housing 221 is secured into the floor box, the floor box covering assembly 201 is assembled. First, the first ring 229 is placed over the open upper end 227 of the termination housing 221 and attached to the termination housing 221 using screw channels 233 and screws therethrough.

Second, the cover 281 is pivotally attached to the second ring 255. The gasket 289 is attached to the bottom surface of the cover 281 such that the cut-out 291 in the gasket 289 is aligned with the access opening 287 of the cover 281, so that the gasket material does not obstruct the access opening 287. The cover 281 is then attached to the second ring 255 by placing the male adapter 279 of the cover 281 into the female adaptor 269 of the second ring 255. A pin 277 is slidably positional through the pin slot 275 of the second ring 255 and through the pin hole 249 of the male adaptor 279 to pivotally attach the cover 281 to the second ring 255.

In the embodiment shown, this enables cover 281 to rotate about a horizontal axis passing through pin 277.

Next, the second ring 255 is connected to the first ring 229. The rings (229, 255) are connected by aligning the tab 209 and tab slots 261 of the respective ring 229, 255. The second ring 255 placed on top of the first ring 229, such that the tabs 209 pass through the slots 261 and the second ring 255 lays flush with the recessed planar disk 235 of the first ring 229. The second 255 is rotated clockwise about a vertical axis and the locking ramp 267 guides the tab 209 over the locking ramp 267. The locking ramp 267 is forced downwardly by one of the tabs 209 of the first ring 229, as the tab 209 rides over the locking ramp 267. The locking ramp 267 passes under the tab 209 and pops back up on the other side of the tab 209 after tab 209 passes completely over the locking ramp 267, as shown in FIG. 16. The one-way tab guiding design of the locking ramp 267 prevents the tab 209 from rotating counter clock-wise back over the locking ramp 267 without manual manipulation.

The assembled floor box cover assembly 201 and function is similar to the floor box cover assembly 101 of FIG. 14 (14A–14E), and further described herein.

Generally, the cover 281 and second ring 255 rotate about a vertical axis with respect to the first ring 229 and termination housing 221. The cover 281 may be pivotally opened or closed about a horizontal axis at any rotated position of the rings (229, 255). The second ring 255 may be rotated about the first ring 229 at any position between the pair of indication marks 233, 234 on the first ring assembly 229.

FIG. 15 shows the cover 281 pivotably closed and the floor box cover assembly 201 rotated in a blocked position. The blocked position prevents water, objects or wires from entering or exiting the access opening 287 of the cover 281. The tongue 245 of the first ring 229 obstructs the access opening 287 as identified by the alignment of the indication arrow 233 of the first ring 229 and indication arrow 273 of the second ring 255. A stopper 283 located on the second ring 255 obstructs one of the tabs 209 of the second ring 255 and prevents it from rotationally advancing beyond the fully opened position indicated by the mark 234, as shown in FIG. 17.

Figure 18:
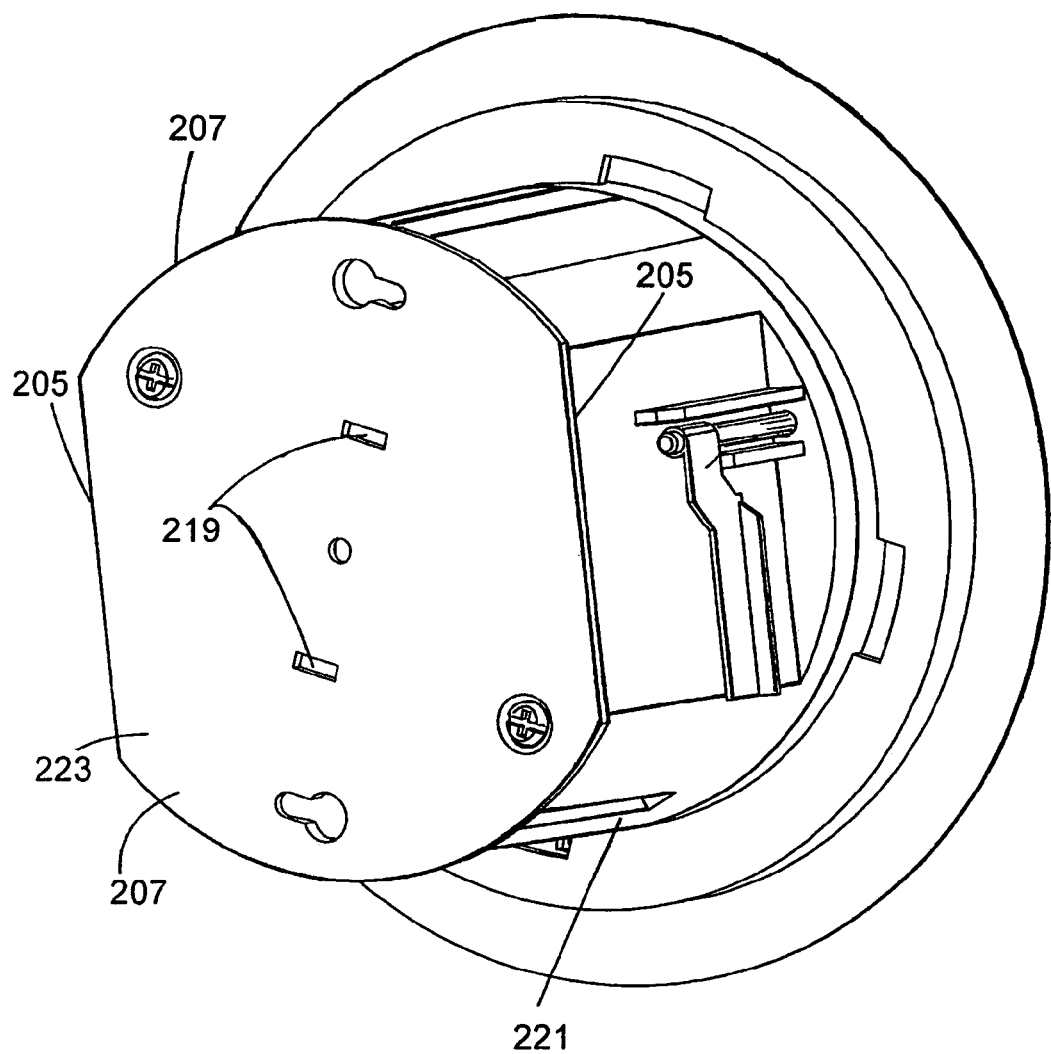
FIG. 18 is a bottom perspective view of FIG. 15.

The second ring 255 is rotated clockwise about a vertical axis to the fully open position, aligning the indication mark 285 of the second ring 255 with marking 234 of the first ring 229, as shown in FIGS. 17 and 18. Wires may be inserted into the termination housing interior 231 and connected to the receptacle outlets when the cover 281 is opened, as shown in FIG. 17. Then the cover 281 is pivotally closed over the termination housing 221 and the access open 287 of the cover 281 allows for the wires to exit therethrough, as shown in FIG. 18.

Various changes to the foregoing described and shown structures would now be evident to those skilled in the art. Accordingly, the particularly disclosed scope of the invention is set forth in the following claims.

What is claimed is:

1. A floor box cover assembly comprising:
  a) a first ring including a raised inner annular lip and planar flange thereabout, said flange including an elongated hole therethrough;
  b) a second ring including a top surface and a bottom surface, said top surface having a planar inner rim and a depending raised wedge thereabout, said raised wedge including a pivotal engagement portion, said second ring being seated on top of said planar flange of said first ring; and c) a cover including a pivotal cover portion, said pivotal engagement portion and said pivotal cover portion cooperatively providing a pivotal connection of said cover to said second ring.

2. The floor box cover assembly of claim 1, wherein said inner annular lip further includes a tongue projecting inwardly therefrom.

3. The floor box cover assembly of claim 2, wherein said cover further includes an access opening therethrough to provide access of a wire through said cover in a closed position.

4. The floor box cover assembly of claim 3, wherein said tongue is larger than said access opening to block said access opening where no wires are positioned therethrough.

5. The floor box cover assembly of claim 4, wherein said tongue includes a divot to cooperatively assist in opening said cover with a tool.

6. The floor box cover assembly of claim 3, further includes a pivot extending through said pivotal engagement portion and said pivotal cover portion to provide a hinged connection between said cover and said second ring.

7. The floor box cover assembly of claim 6, wherein said hinged connection is diametrically opposed to said access opening of said cover.

8. The floor box cover assembly of claim 6, wherein said wedge of said second ring further includes a cover retaining feature, said retaining feature includes a flattened portion having indentations therein, said cover including locking knobs, said locking knobs being removably engageable with said indentations to retain said cover in a closed position.

9. The floor box cover assembly of claim 8, wherein said planar flange of said first ring further includes an elongated hole therethrough and a pin extending through said elongated hole, said bottom surface of said second ring further includes a pin hole therein for accepting a portion of said pin therein, a portion of said pin remains extended through said elongated hole into said pin hole to provide controlled rotational movement between said second ring and said first ring.

10. The floor box cover assembly of claim 9, wherein said pin is a screw.

11. The floor box cover assembly of claim 9, wherein said first ring including attachment mechanism to provide attachment of said ring assembly to a housing.

12. The floor box cover assembly of claim 11, wherein said first ring and said second ring include visual indicia thereon to identify said cover in an access opened position or an access closed position.

13. The floor box cover assembly of claim 11, further including a gasket having a cutout therethrough to correspond to said access opening of said cover.

14. The floor box cover assembly of claim 9, integrally molded with a housing to provide a molded unit.

15. A floor box cover assembly comprising:

a) a first ring including a raised inner annular lip and planar flange thereabout, said raised annular lip including a tongue protruding inwardly and a housing attachment mechanism protruding inwardly, said planar flange including a pair of elongated holes;

b) a second ring including a planar inner flange and a depending raised portion wrapping around an exterior circumference of said planar inner flange, said raised portion having a cover locking mechanism, a hinged ring attachment member diametrically opposed to said cover locking mechanism, and a pair of pin holes, said second ring being seated on said planar flange of said first ring; and c) a planar cover including an access opening, protruding locking nubs and a hinge cover attachment member, said hinged cover attachment member and said hinged ring attachment member cooperatively providing a pivotal connection of said cover to said second ring, said protruding locking nubs being located on a perimeter of said cover to engage with said cover locking mechanism to retain said cover in a closed position.

16. The floor box cover assembly of claim 15, wherein said a pair of screws extend through said elongated holes of said first ring and said pin holes of said second hole to provide rotational engagement of said first ring and said second ring.

17. The floor box cover assembly of claim 16, wherein said tongue is larger than said access openings to block said access opening where no wires are positioned therethrough.

18. The floor box cover assembly of claim 17, wherein said tongue includes a divot to cooperatively assist in opening said cover with a tool.

19. The floor box cover assembly of claim 18, further including a pivot extending through said hinged ring attachment mechanism and said hinged cover attachment mechanism to provide a hinged connection between said cover and said second ring.

20. The floor box cover assembly of claim 19, wherein said hinged connection is diametrically opposed to said access opening of said cover.

21. The floor box cover assembly of claim 20, wherein said cover locking mechanism further includes a flattened portion having indentations therein, said protruding locking nubs of said cover being removably engageable with said indentations to retain said cover in a closed position.

22. The floor box cover assembly of claim 21, wherein said first ring and said second ring include visual indicia thereon to identify said cover in an access opened position or an access closed position.

23. The floor box cover assembly of claim 22, further including a gasket having a cutout therethrough to correspond to said access opening of said cover.

* * * * *